(12) United States Patent
Itoh et al.

(10) Patent No.: US 7,386,553 B2
(45) Date of Patent: Jun. 10, 2008

(54) DATA PROCESSING DEVICE

(75) Inventors: Masanori Itoh, Moriguchi (JP); Osamu Okauchi, Hirakata (JP); Tadashi Nakamura, Nara (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/519,776

(22) PCT Filed: Mar. 3, 2004

(86) PCT No.: PCT/JP2004/002678

§ 371 (c)(1),
(2), (4) Date: Jul. 25, 2005

(87) PCT Pub. No.: WO2004/080071

PCT Pub. Date: Sep. 16, 2004

(65) Prior Publication Data

US 2006/0165387 A1 Jul. 27, 2006

(30) Foreign Application Priority Data

Mar. 6, 2003 (JP) ............................. 2003-059931
Apr. 23, 2003 (JP) ............................. 2003-118252

(51) Int. Cl.
*G06F 17/30* (2006.01)
(52) U.S. Cl. ....................................................... 707/10
(58) Field of Classification Search .............. 707/1–10, 707/100–104.1, 200–206; 370/473, 535; 386/111; 725/135
See application file for complete search history.

(56) References Cited

U.S. PATENT DOCUMENTS 6,172,988 B1 * 1/2001 Tiernan et al. .............. 370/473
6,272,286 B1   8/2001 Asada et al.
6,285,825 B1   9/2001 Miwa et al.
6,873,629 B2 * 3/2005 Morris ....................... 370/535
7,065,781 B1 * 6/2006 Entwistle .................... 725/135
2002/0037160 A1 * 3/2002 Locket et al. ............... 386/111
2002/0197058 A1  12/2002 Suzuki et al.

FOREIGN PATENT DOCUMENTS

JP        2003-045161        2/2003

OTHER PUBLICATIONS

In re Petrus A.C.M. Nuijten,—F.3d—, 2007 WL 2728397 (Fed. Cir. Sep. 20, 2007) (no official report as yet),☐☐(from Westlaw, pp. 1-19).☐☐.*
International Search Report for corresponding PCT/JP2004/002678, mailed Jun. 22, 2004.

* cited by examiner

*Primary Examiner*—Diane Mizrahi
(74) *Attorney, Agent, or Firm*—Renner, Otto, Boisselle & Sklar, LLP

(57) ABSTRACT

A data processor includes a stream assembling section which divides video and audio data into a plurality of packets, and makes a plurality of data units, in each of which a video packet representing a fraction of the video data and an audio packet representing a fraction of the audio data are multiplexed together to generate a data stream composed of a plurality of data units; and a writing section for writing the data stream on a storage medium. The stream assembling section determines what video packets and audio packets are included in each data unit, and if a portion of audio data, which is associated with the video data stored in a predetermined data unit, is missing from the predetermined data unit, then copied data, obtained by copying partial audio data including at least that missing portion of the audio data, is put into the data stream.

18 Claims, 12 Drawing Sheets

DATA PROCESSING DEVICE

TECHNICAL FIELD

The present invention relates to a method and apparatus for recording a content including video and audio in real time.

BACKGROUND ART

Various types of data streams have been standardized to encode and compress video data at low bit rates. A system stream compliant with MPEG2 system standard ISO/IEC 13818-1 is known as one such data stream. A "system stream" is a generic term for the three types of streams, namely, program stream (PS), transport stream (TS) and PES stream.

In recent years, more and more attention has been paid to phase change optical discs, MOs and other optical discs as data stream storage media to replace magnetic tapes. A DVD video recording standard (i.e., DVD Specifications for Rewritable/Re-recordable Discs Part 3 VIDEO RECORDING, version 1.0, Sep. 1999, which will be referred to herein as "VR standard") is currently known as a standard for recording the data stream of some content on a phase change optical disc (such as a DVD) in real time and for making it editable. Also, a DVD Video standard (which will be referred to herein as "Video standard") is also defined as a standard for a package medium to store the data stream of a read-only content such as a movie thereon.

FIG. 1 shows a data structure for an MPEG2 program stream 10 compliant with the VR standard (which will be referred to herein as a "VR-compliant stream 10").

The VR-compliant stream 10 includes a plurality of video objects (VOBs) #1, #2, . . . , and #k. Supposing the VR-compliant stream 10 is a content that was taken with a camcorder, for example, each VOB stores moving picture data that was generated during a single video recording session (i.e., since the user started recording the video and until he or she stopped doing it).

Each VOB includes a plurality of VOB units (VOBUs) #1, #2, . . . , and #n. Each VOBU is a data unit containing video data with a video playback time falling within the range of 0.4 second to 1 second in most cases.

Hereinafter, the data structure of VOBUs will be described with the first and second video object units VOBU #1 and VOBU #2 shown in FIG. 1 taken as an example.

VOBU #1 is composed of a number of packs, which belong to a low-order layer of an MPEG program stream. In the VR-compliant stream 10, each pack has a fixed data length (also called a "pack length") of 2 kilobytes (i.e., 2,048 bytes). At the top of the VOBU, a real time information pack (RDI pack) 11 is positioned as indicated by "R" in FIG. 1. The RDI pack 11 is followed by multiple video packs "V" (including video pack 12) and multiple audio packs "A" (including audio pack 13). It should be noted that even if the playback time is the same but if the video data has a variable bit rate, the data size of each VOBU is changeable within a range defined by a maximum read/write rate. However, if the video data has a fixed bit rate, the data size of each VOBU is substantially constant.

Each pack stores the following information. As disclosed in Japanese Laid-Open Publication No. 2001-197417, for example, the RDI pack 11 stores various information for controlling the playback of the VR-compliant stream 10, e.g., information representing the playback timing of the VOBU and information for controlling copying of the VR-compliant stream 10. The video packs 12 store MPEG2-compressed video data thereon. The audio packs 13 store audio data that was compressed so as to comply with the MPEG2 Audio standard, for example. In adjacent video and audio packs 12 and 13, video and audio data to be played back synchronously with each other may be stored.

VOBU #2 is also made up of a plurality of packs. An RDI pack 14 is placed at the top of VOBU #2, and then followed by a plurality of video packs 15 and a plurality of audio packs 16. The contents of the information to be stored in each of these packs are similar to those of VOBU #1.

It should be noted that the RDI pack is not always positioned at the top of each VOBU within a VOB. Whenever the RDI pack is not located at the top of a VOBU, a video pack is always positioned there.

FIG. 2 shows a relationship between a video stream composed of the video data stored in video packs and an audio stream composed of the audio data stored in audio packs.

Specifically, in VOBU #i, a picture 21b of the video stream is composed of the video data that has been stored in at least one pack including the video pack 21a, the next picture is composed of the video data that has been stored in at least one pack including the video pack 22, and each of the following pictures is also composed of the video data that has been stored in following video packs. Meanwhile, an audio frame 23b is composed of the audio data that has been stored in the audio pack 23a. The same statement applies to the other audio packs. It should be noted that the data in one audio frame may be stored in two or more audio packs separately. Alternatively, multiple audio frames may be included in one audio pack.

Also, any audio frame data included in a VOBU is supposed herein to be complete within that VOBU. That is to say, the audio frame data contained in a VOBU is all included within that VOBU and never included in the next VOBU.

The video and audio frames are played back in accordance with the information specifying the presentation times (i.e., presentation time stamps (PTS)), which is stored in the packet headers of the respective video and audio packs. In the example shown in FIG. 2, the video picture 21b and the audio frame 23b are played back at substantially the time times, i.e., synchronously with each other.

Look at the video packs 24a and 24b of VOBU #i. The last picture 24c of VOBU #i is made up of the video data stored in the video packs 24a through 24b. As described above, each VOBU is constructed with reference to the video playback times, for example, with no special attention paid to the sound. Accordingly, the data in the audio frame 25c additionally includes presentation time information (PTS) so as to be played back synchronously with the video picture 24c, but can still be stored in the audio packs 25a and 25b of the next VOBU #(i+1).

In this manner, the audio frame to be played back synchronously with the video frame has its storage location shifted from that of the video frame. This is because in a system target decoder (P-STD) defining rules in multiplexing the video and audio packs, the data size (e.g., 224 kilobytes) of a video data buffer is much greater than the data size (e.g., 4 kilobytes) of an audio data buffer. The audio data allows just a small amount of data to be accumulated, and is multiplexed so as to be retrieved just before the playback timing.

With respect to such a program stream, the user can register his or her desired VOBU playback order as a "play list". In accordance with the play list, the player plays back video and so on by acquiring the data of a specified VOBU and then continues the playback by reading data out from the beginning of the specified VOBU.

However, if the video data and audio data to be played back synchronously with each other were stored in different VOBUs, then the sound could be discontinued while the video and audio data are being played back in accordance with the play list. This is because the data is read out continuously from the target VOBU but the audio data, stored in the next non-target VOBU, is not. In that case, only the video is played back but the audio to be played back synchronously with the video is not played back.

In the example illustrated in FIG. 2, the play list may specify that VOBU #k (where k≠(i+1)) should be played back after VOBU #i has been played back. In that case, after the data has been read out from the video picture 24c of VOBU #i, data is read out from the next specified VOBU #k. Accordingly, the data of the audio frame 25c, which is stored in VOBU #(i+1) and which should be played back synchronously with the video picture 24c, is not read out and the sound is not reproduced. As a result, the user hears the sound discontinued during the playback.

Also, even in VOBU #k, the storage location of the audio frame associated with its top video picture changes from one VOBU to another, and is determined by the correlation between VOBU #k and its previous VOBU (i.e., VOBU #(k−1)). More specifically, the storage location is determined by the bit rate of the program stream and the buffer size of the system target decoder (P-STD). Accordingly, even if VOBU #i includes every audio frame to be played back synchronously, VOBU #k does not always store every audio frame to be played back synchronously from its very beginning. This is also why the user hears the sound discontinued during the playback.

An object of the present invention is to reduce significantly, or eliminate if possible, the period in which the sound is discontinued even if the video and audio data are played back in accordance with a play list, for example.

DISCLOSURE OF INVENTION

A data processor according to the present invention includes: a signal input section to which a video signal and an audio signal are input; a compressing section for coding and compressing the video and audio signals to generate video data and audio data; a stream assembling section, which divides each of the video data and the audio data into a plurality of packets, and makes a plurality of data units, in each of which a video packet representing a fraction of the video data and an audio packet representing a fraction of the audio data are multiplexed together to generate a data stream composed of a plurality of said data units; and a writing section for writing the data stream on a storage medium. The stream assembling section determines, at least by a video playback time, what video packets and audio packets are included in each said data unit, and if a portion of audio data, which is associated with the video data stored in a predetermined data unit, is missing from the predetermined data unit, then copied data, obtained by copying partial audio data including at least that missing portion of the audio data, is put into the data stream.

The stream assembling section may store the copied data, associated with the data unit, in the first one of the video packets of the following data unit.

The stream assembling section may store the copied data within the associated data unit.

The stream assembling section may store the copied data in a dedicated audio stream within the data stream.

The stream assembling section may store the copied data in a dedicated private data stream within the data stream.

The stream assembling section may put copied data, obtained by copying all of the audio data associated with the video data, into the predetermined data unit.

The stream assembling section may store the copied data in a dedicated private data stream within the data stream.

The stream assembling section may store copied data, obtained by copying all of the audio data synchronized with the video data, in a dedicated audio stream within the data stream.

The stream assembling section may store copied data, obtained by copying all of the audio data synchronized with the video data, in a dedicated audio stream within the data stream, and may define a transfer timing, which is earlier than the transfer timing of the data unit as original of the copied data by a predetermined amount of time, and record the transfer timing as transfer timing information representing the transfer timing of the copied data.

The stream assembling section may generate the data stream as an assembly of a first file including a plurality of said data units and a second file including the copied data, and the writing section may write the data units and the copied data on the storage medium continuously.

The stream assembling section may define the second file by copied data to be obtained by copying all of the audio data associated with the video data.

Rate information may be added to the audio data. The audio data may have a data length representing the rate information. The compressing section may generate the audio data by coding and compressing the audio signal at a first rate. The stream assembling section may generate the audio data by setting a second rate, which is higher than the first rate, as the rate information for the audio data included in the predetermined data unit and may store the copied data in a reserved area that represents a difference between a second data length, which is defined so as to correspond to the second rate, and the first data length of the audio data, which is defined so as to correspond to the first rate.

A data processing method according to the present invention includes the steps of: receiving a video signal and an audio signal; generating video data and audio data by coding and compressing the video and audio signals; generating a data stream composed of a plurality of data units by dividing each of the video data and the audio data into a plurality of packets, and by making a plurality of data units, in each of which a video packet representing a fraction of the video data and an audio packet representing a fraction of the audio data are multiplexed together; and writing the data stream on a storage medium. The step of generating the data stream includes the steps of determining, at least by a video playback time, what video packets and audio packets are included in each said data unit, and if a portion of audio data, which is associated with the video data stored in a predetermined data unit, is missing from the predetermined data unit, putting copied data, obtained by copying partial audio data including at least that missing portion of the audio data, into the data stream.

The step of generating the data stream may include the step of storing the copied data, associated with the data unit, in the first one of the video packets of the following data unit.

The step of generating the data stream may include the step of putting copied data, obtained by copying all of the audio data associated with the video data, into the predetermined data unit.

The step of generating the data stream may include the step of generating the data stream as an assembly of a first file including a plurality of said data units and a second file including the copied data.

The step of generating the data stream may include the step of defining the second file by copied data by copying all of the audio data associated with the video data.

Rate information may be added to the audio data. The audio data may have a data length representing the rate information. The step of generating the audio data may include the step of generating the audio data by coding and compressing the audio signal at a first rate. The step of generating the data stream may include the steps of generating the audio data by setting a second rate, which is higher than the first rate, as the rate information for the audio data included in the predetermined data unit and storing the copied data in a reserved area that represents a difference between a second data length, which is defined so as to correspond to the second rate, and the first data length of the audio data, which is defined so as to correspond to the first rate.

A storage medium according to the present invention stores thereon a data stream composed of a plurality of data units. Each of these data units is made by multiplexing together a video packet representing a fraction of video data and an audio packet representing a fraction of audio data. The video data and a portion of the audio data associated with the video data are stored in a predetermined data unit. Partial audio data, which is the other portion of the audio data associated with the video data, is not stored in the predetermined data unit. The data stream further includes copied data obtained by copying the partial audio data.

Another data processor according to the present invention receives and decodes the data stream and outputs a video signal and an audio signal. The data processor includes a reading control section for specifying data to be read out from the data stream, a reading section for reading the video data and a portion of the audio data associated with the video data from the predetermined data unit of the data stream in accordance with the instruction of the reading control section, and a decoding section for decoding the video data and the portion of the audio data and outputting the video signal and the audio signal synchronously with each other. After having given the instruction, the reading control section further instructs the reading section to read the copied data. After having decoded the portion of the audio data, the decoding section decodes the copied data and outputs the decoded copied data synchronously with the video signal.

BEST MODE FOR CARRYING OUT THE INVENTION

EMBODIMENT 1

Hereinafter, a configuration for a data processor according to a preferred embodiment of the present invention, as well as the data structure of a data stream associated with the processing done by the data processor, will be described. After that, it will be described how the data processor performs read and write operations. The data stream is supposed herein to be an MPEG2 program stream compliant with the DVD video recording standard (i.e., the VR standard), which will be referred to herein as a "VR-compliant streams.

Figure 3:
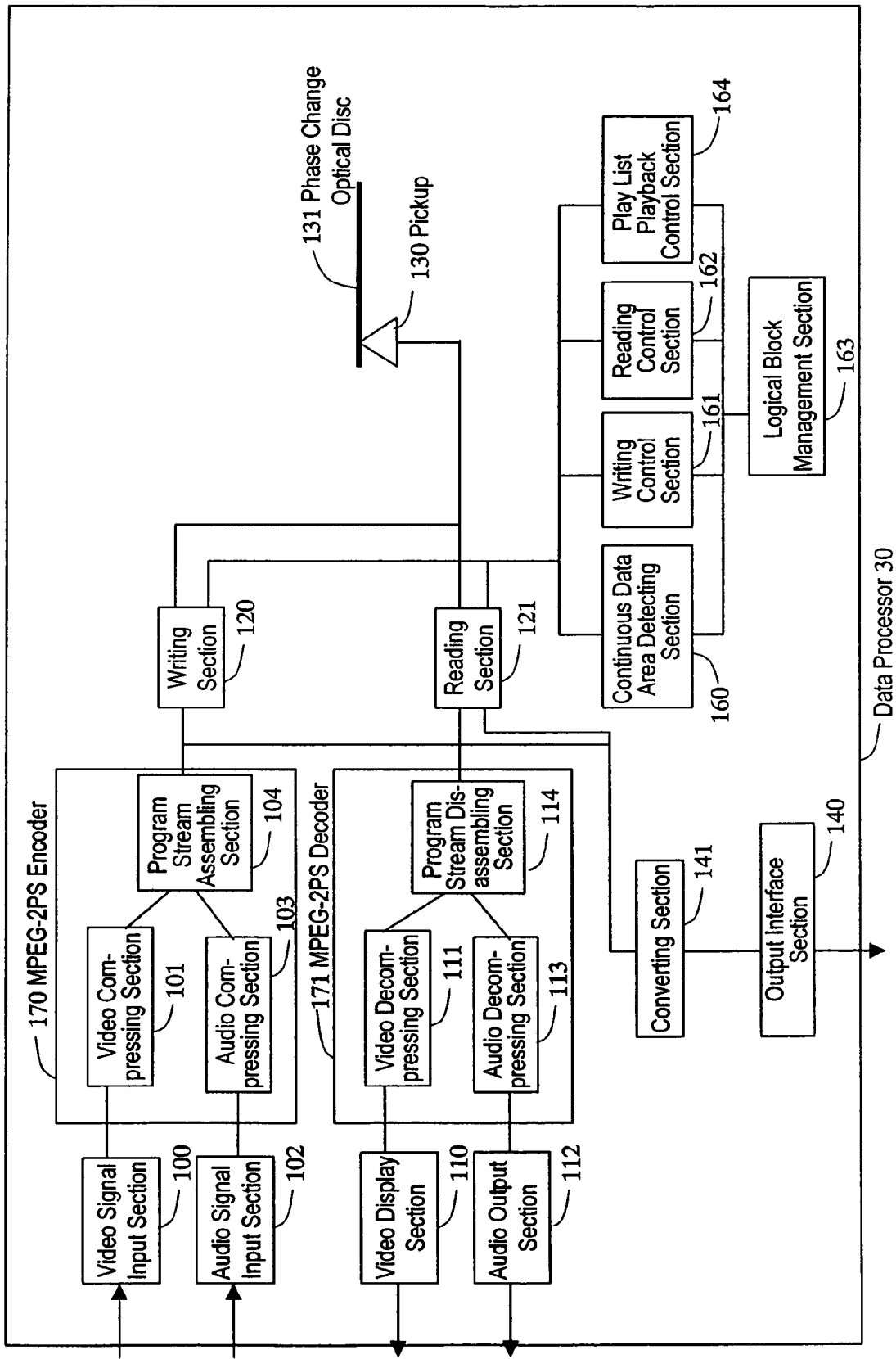
FIG. 3 shows an arrangement of functional blocks for a data processor 30.

FIG. 3 shows an arrangement of functional blocks for a data processor 30. The data processor 30 has a recording function of writing a VR-compliant stream 10 in real time on a storage medium such as a DVD-RAM disc, a Blu-ray disc (BD) or any other phase change optical disc 131. In addition, the data processor 30 also has a playback function of reading, decoding and playing the VR-compliant stream 10 stored. However, to carry out the processing of the present invention, the data processor 30 does not always have to have both of the recording and playback functions. The data processor 30 may be a camcorder or any other installed type device.

Hereinafter, the configuration of the data processor 30 to carry out the recording function will be described. The data processor 30 includes a video signal input section 100, an audio signal input section 102, an MPEG2-PS encoder 170, a writing section 120, a continuous data area detecting section 160, a writing control section 161 and a logical block management section 163.

First, it will be outlined how the data processor 30 performs a write operation. In generating and writing a VR-compliant stream 10, the PS assembling section 104 (to be described in detail later) of the MPEG2-PS encoder 170 generates video object units (VOBUs) as data units by determining the video and audio packs to be included in the VOBUs at least by the video playback time. And if a portion of audio data, which is associated with the video data stored in a VOBU, is missing from the VOBU, then copied data, obtained by copying at least that missing portion of the audio data, is put into the VR-compliant stream 10. As used herein, the "audio associated with the video" means "audio to be played back synchronously with the video".

The copied data may be stored either in the next VOBU (e.g., in the user data area of the first video pack.) or in an audio file separately provided from the file of the VR-compliant stream 10. Alternatively, the audio data may be stored either as a private stream or as ancillary information such that the video and audio data to be played back synchronously with each other are included within a single VOBU.

As another alternative, all of the audio data, associated with the video data, may be interleaved as an independent audio stream within the same VOBU. The audio data may also be stored in an audio file, which is provided separately from the file of the VR-compliant stream 10. As yet another alternative, all of the audio data, associated with the video data, may be stored as a private stream.

Hereinafter, the general functions of respective components to carry out the recording function of the data processor 30 will be described with reference to FIGS. 3 through 6. After that, it will be described with reference to FIGS. 7 and 8 exactly how the data processor 30 performs a write operation.

The video signal input section 100 is a video signal input terminal to receive a video signal representing the video data. The audio signal input section 102 is an audio signal input terminal to receive an audio signal representing the audio data. If the data processor 30 is implemented as a videocassette recorder, for example, then the video signal and audio signal input sections 100 and 102 are respectively connected to the video output section and audio output section of a tuner section (not shown) to receive a video signal and an audio signal from the tuner section. On the other hand, if the data processor 30 is implemented as a movie recorder or a camcorder, then the video signal and audio signal input sections 100 and 102 respectively receive a video signal and an audio signal from the CCD (not shown) and microphone of the camera.

The MPEG2-PS encoder 170 (which will be simply referred to herein as an "encoder 170") receives the video signal and audio signal, thereby generating an MPEG2 program stream (PS) compliant with the VR standard (i.e., the VR-compliant stream 10). The encoder 170 includes a video compressing section 101, an audio compressing section 103, and a PS assembling section 104. The video and audio compressing sections 101 and 103 compress and code the video data and audio data, obtained from the video signal and audio signal, respectively, according to the MPEG2 standard. The PS assembling section 104 divides the compression-coded video and audio data into video packs and audio packs, each composed of 2 kilobytes, rearranges these packs such that one VOBU is made up of these packs, and adds an RDI pack 27 to the top, thereby generating the VR-compliant stream 10.

Figure 1:
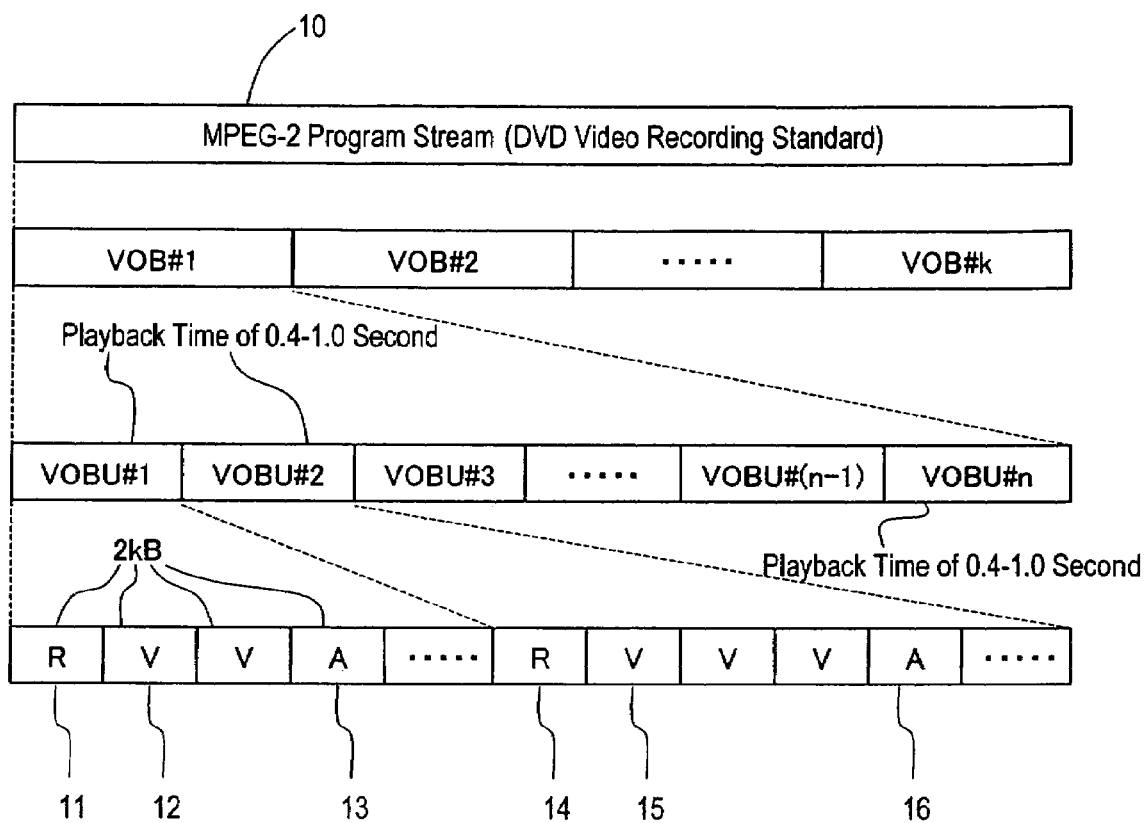
FIG. 1 shows a data structure for an MPEG2 program stream 10 compliant with the VR standard.
Figure 2:
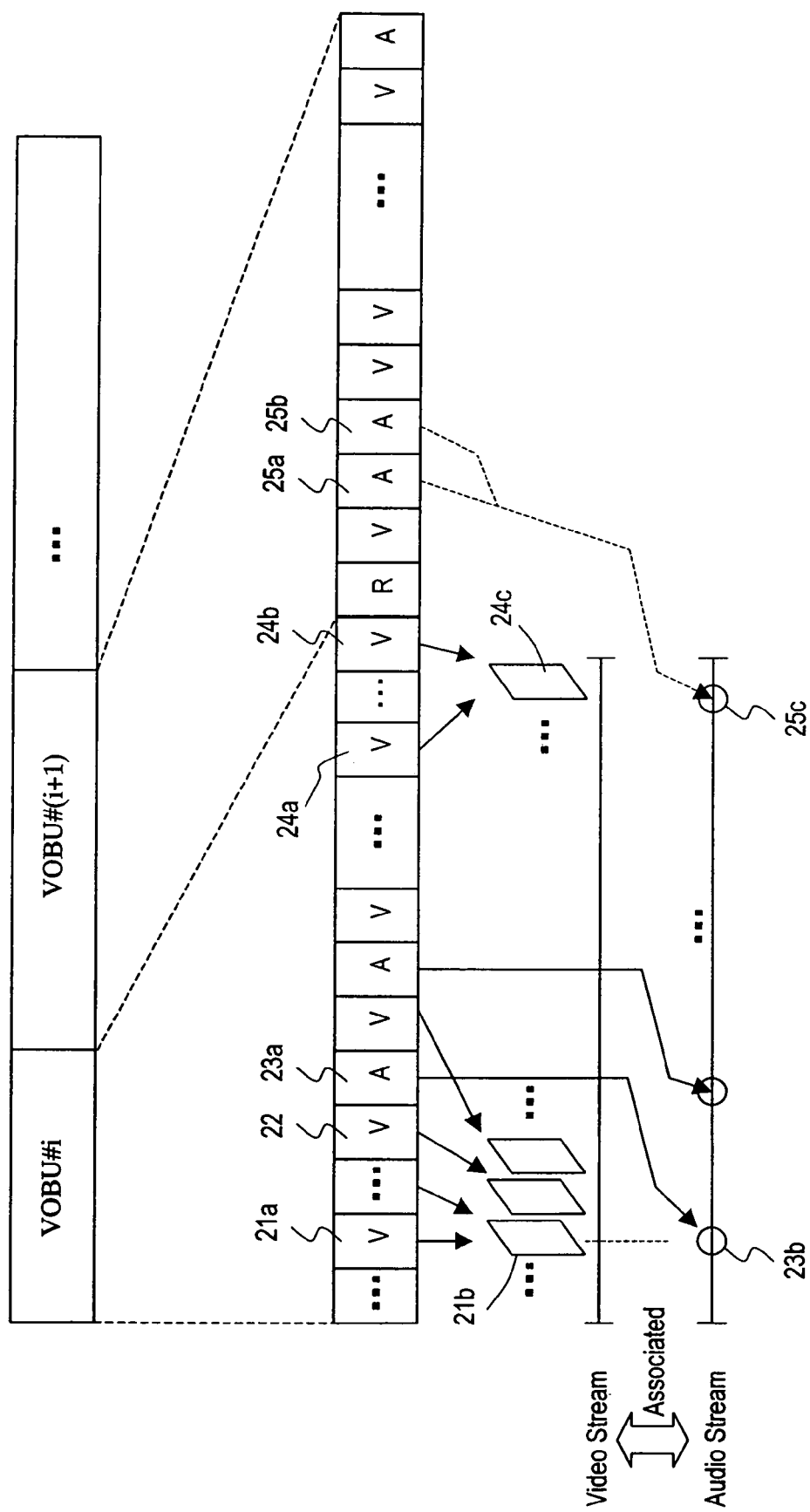
FIG. 2 shows a relationship between a video stream composed of the video data stored in video packs and an audio stream composed of the audio data stored in audio packs.
Figure 4:
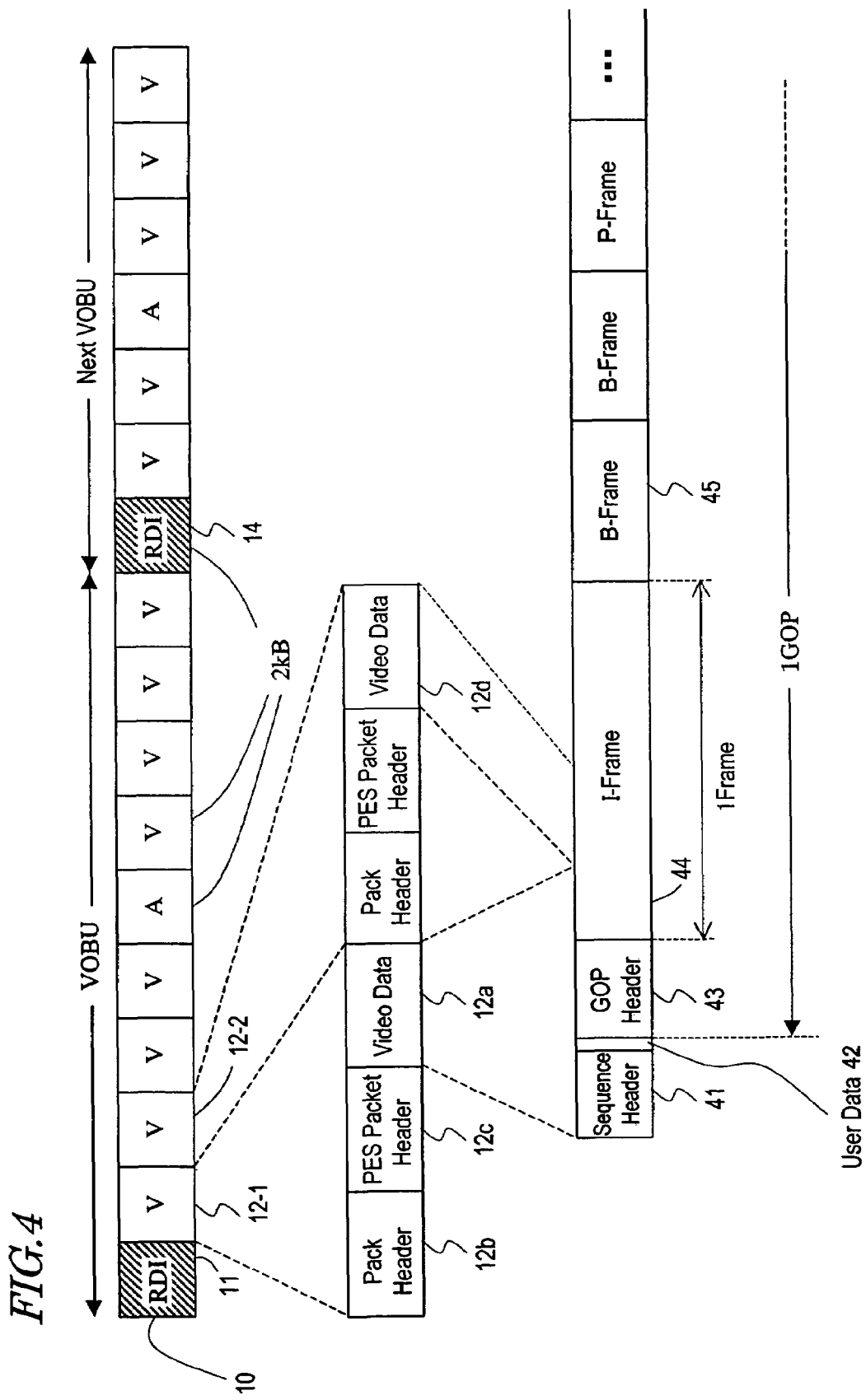
FIG. 4 shows the data structure of a VR-compliant stream 10.

FIG. 4 shows the data structure of the VR-compliant stream 10. The VR-compliant stream 10 includes a plurality of VOBUs. Just two VOBUs are shown in FIG. 2 but the VR-compliant stream 10 may include more VOBUs. In the VR-compliant stream 10, each VOBU is made up of a plurality of packs. These packs and the information contained in each of these packs are just as already described with reference to FIG. 1 and the description thereof will be omitted herein.

The data structure of the video pack 12-1 and so on will be described briefly. The video pack 12 stores MPEG2-compressed video data 12a therein. The video pack 12 further includes a pack header 12b and a PES packet header 12c indicating the identity as a video pack. Also, if the video pack 12 is the first one of the VOBU, a system header (not shown) is further included in the pack header 12b.

The video data 12a of the video pack 12-1 shown in FIG. 4, along with the video data 12d and so on of the following video packs 12-2, etc., make up the data of an I-frame 44. After the I-frame, video packs making up a B-frame 45 or a P-frame are recorded continuously.

The video data 12a further includes a sequence header 41, user data 42 and a GOP header 43. The MPEG2 standard defines a "group of pictures (GOP)" as a group of video frames. The sequence header 41 indicates the top of a sequence made up of a plurality of GOPs. On the other hand, the GOP header 43 indicates the top of each GOP. The first frame of each GOP is an I-frame. These headers are well known in the art and the detailed description thereof will be omitted herein. The user data 42 is stored between the sequence header 41 and the GOP header 43 and can describes any arbitrary data.

A start code to identify each of the sequence header 41, user data 42 and GOP header 43 is added to the top of the sequence header 41, user data 42 and GOP header 43. For example, "000001B3", "000001B5" and 000001B8" (which are all hexadecimal representations) may be added to the sequence header 41, user data 42 or GOP header 43, respectively. The user data 42 continues being read until the start code of the following GOP header 43 is detected. Once the start code of the GOP header 43 has been detected, all of the acquired data, except the top header B5 of the user data 42, is obtained as the user data.

It should be noted that the overall playback time of all GOPs within a single VOBU is adjusted so as to fall within the range of 0.4 second to 1.0 second in principle. The last VOBU is an exception, in which the overall playback time is adjusted so as to fall within the range of 0 seconds to 1.0 second. This is because the VR-compliant stream 10 is recordable in real time and can stop being recorded in a time of less than 0.4 second. As long as the overall playback time falls within any of these ranges, the variation in video playback time is allowed for any VOBU.

Under the instruction of the writing control section 161, the writing section 120 controls a pickup 130 and starts writing the video object units (VOBUs) of the VR-compliant stream 10 at the logical block address specified by the writing control section 161. In this case, the writing section 120 divides each VOBU on a 32 KB basis, adds an error correcting code to each unit, and writes it as a single logical block on an optical disc 131. If a VOBU is completely written in the middle of one logical block, then the next VOBU starts being written continuously and seamlessly.

Figure 5:
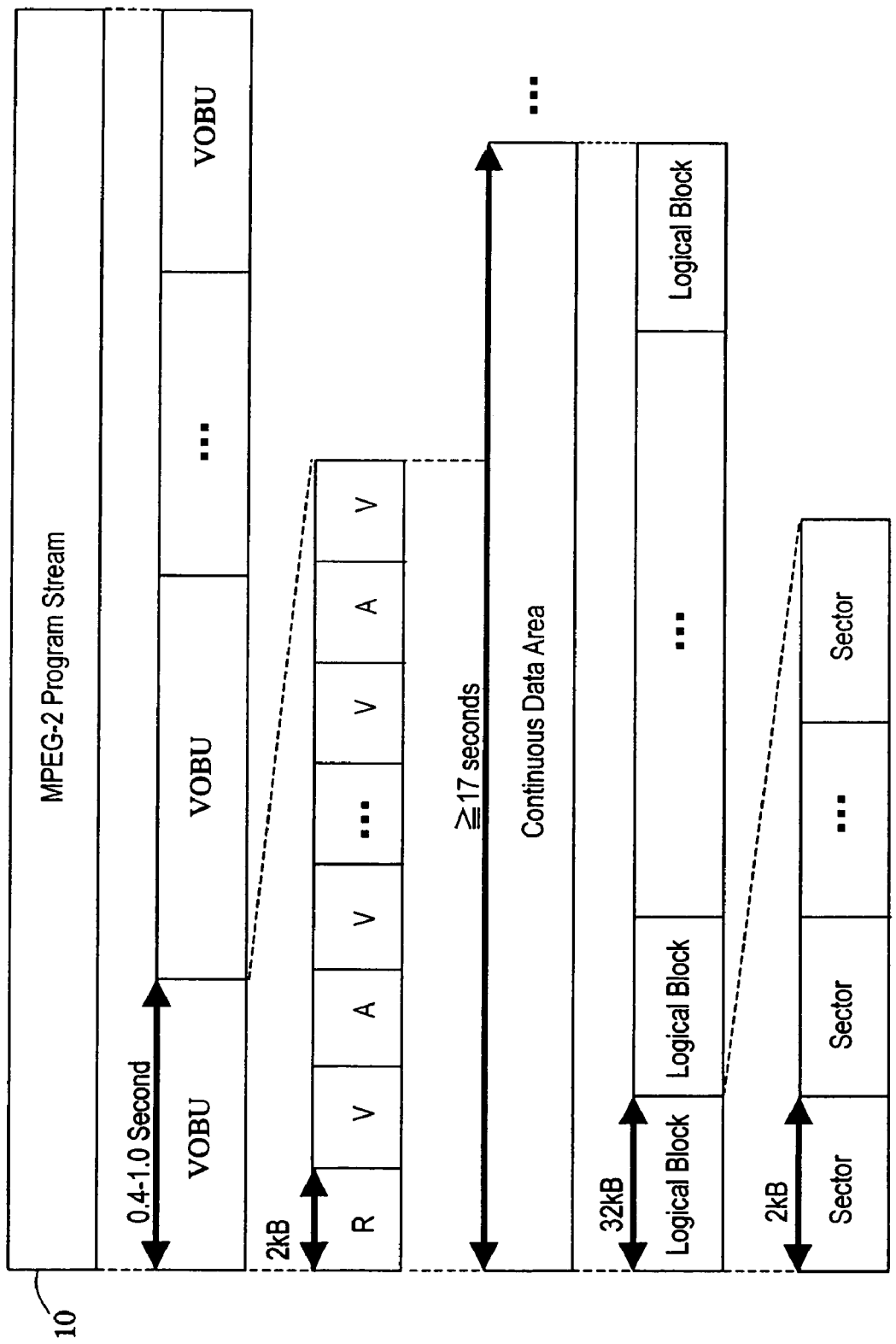
FIG. 5 shows a relationship between the VR-compliant stream 10 and the storage area of the optical disc 131.

FIG. 5 shows a relationship between the VR-compliant stream 10 and the storage area of the optical disc 131. Each VOBU of the VR-compliant stream 10 is written on the continuous data area of the optical disc 131. The continuous data area consists of physically continuous logical blocks and can store data in at least 17 seconds when the data is played back at the maximum rate. The data processor 30 adds the error correction code to each logical block. The data size of each logical block is 32 kilobytes. Each logical block includes sixteen 2 KB sectors.

The continuous data area detecting section 160 checks the availability of sectors on the optical disc 131, which is managed by the logical block management section 163, thereby detecting an unused continuous logical block area available, on which the data can be stored in the length of time mentioned above.

Alternatively, instead of always detecting an available logical block area in which data can be stored continuously in at least 17 seconds to guarantee a continuous playback, the data size of a continuous logical block available may be determined dynamically while the block is traced with the amount of extra playback data accumulated calculated. Specifically, if a continuous data area for 20 seconds is secured at a certain point in time during the write operation, a continuous data area for 14 more seconds may be further secured right next to the previous data area in order to guarantee continuous playback.

The writing control section 161 controls the operation of the writing section 120. The writing control section 161 instructs the writing section 120 to write the VR-compliant stream 10 as a data file (under the file name "VR_MOVIE.VRO", for example) on the optical disc 131. The writing section 120 also writes a VR-compliant stream management information file (under the file name "VR_MANGR.IFO"), received from the writing control section 161, on the optical disc 131, too. The management information includes the data size of each VOBU, the number of video fields included, and the data size of the top I-frame.

More specifically, the writing control section 161 performs its control operation in the following manner. The writing control section 161 instructs the continuous data area detecting section 160 in advance to detect a continuous logical block area available. Thereafter, every time writing is done on a logical block basis, the writing control section 161 notifies the writing section 120 of the logical block number in question. When the logical block has become no longer available, the writing control section 161 notifies the logical block management section 163 of the fact. It should be noted that the writing control section 161 may have the continuous data area detecting section 160 detect the size of the continuous available logical block area dynamically. The continuous data area detecting section 160 detects again the next continuous data area when the remainder of the single continuous data area becomes less than 3 seconds, for example, if converted at the maximum read/write rate. And when the single continuous data area is full, the writing control section 161 instructs writing on the next continuous data area.

Figure 6:
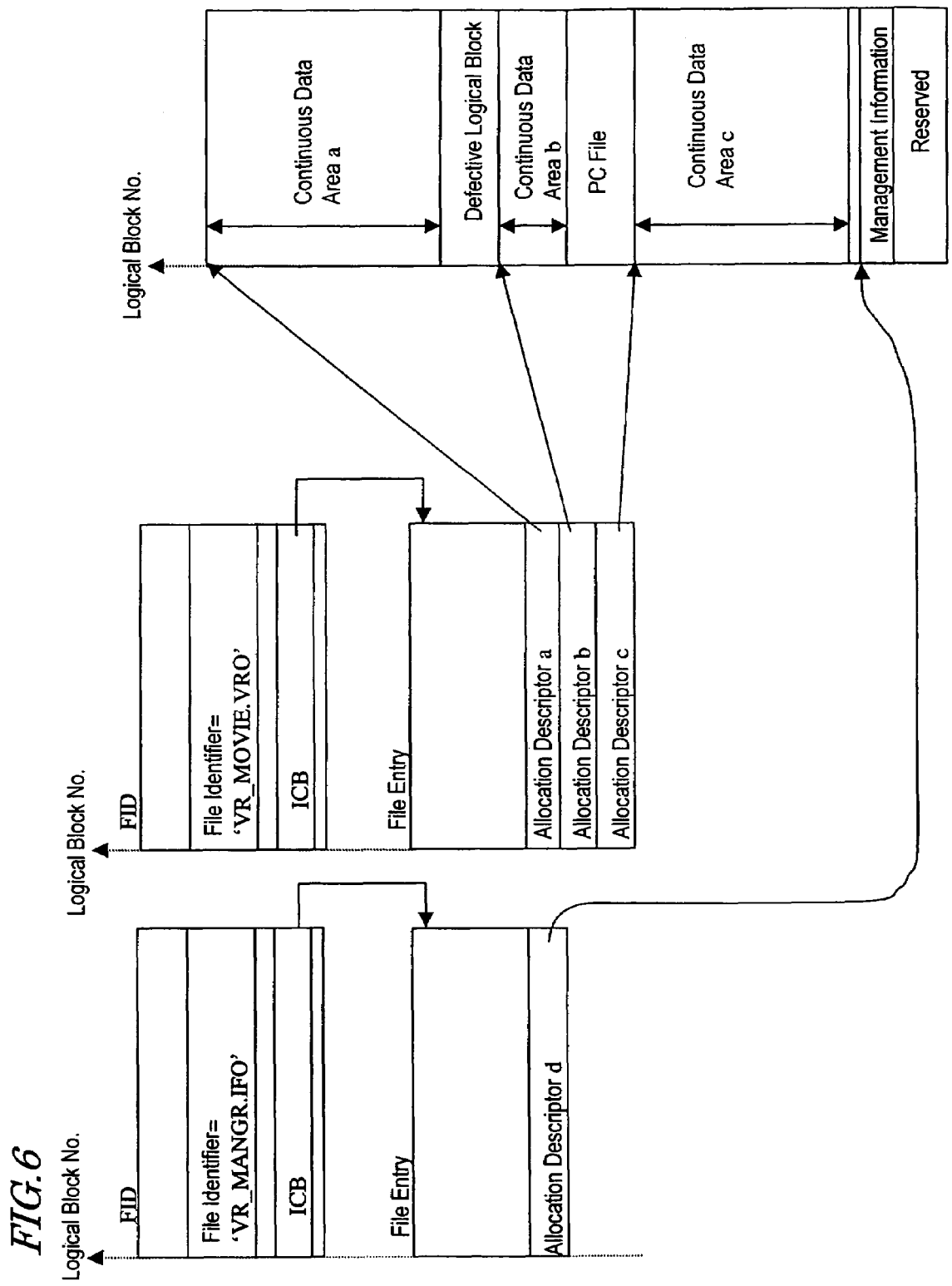
FIG. 6 shows how the VR-compliant stream 10 and management information recorded are managed by the file system of the optical disc 131.

FIG. 6 shows how the VR-compliant stream 10 and management information recorded are managed by the file system of the optical disc 131. In this case, either a file system compliant with the universal disk format (UDF) standard or a file system compliant with ISO/IEC 13346 (Volume and File Structure of Write-Once and Rewritable Media Using Non-Sequential Recording for Information Interchange) may be used. In FIG. 6, the continuously written VR-compliant stream 10 is stored under the file name "VR_MOVIE.VRO", while the management information is stored under the file name "VR_MANGR.IFO". The file name and file entry location of each file are managed by a file identifier descriptor (FID). Furthermore, by using an allocation descriptor within the file entry, a file and the data area that makes up the file are associated with each other. A top sector number is defined as the location of the file entry making up the file for the allocation descriptor. The file entry of the VR-compliant stream includes allocation descriptors a through c for managing the continuous data areas (CDAs) a through c, respectively. One file is divided into these multiple areas a through c because there is a defective logical block, a non-writable PC file or something like that in the middle of the area a. On the other hand, the file entry of the management information file retains another allocation descriptor d to make reference to the management information storage area.

The logical block management section 163 manages the logical blocks by checking their availability on a logical block number basis, i.e., by being notified of the numbers of used logical blocks by the writing control section 161. More specifically, the logical block management section 163 manages each logical block by checking out, by the space bit descriptor area as defined by either UDF or ISO/IEC 13346 file architecture, whether each of the sector units that make up the logical block is used or unused. And at the last stage of the recording process, the logical block management section 163 writes the file identifier (FID) and file entry on the file management area on the disc.

It should be noted that the UDF standard corresponds to a subset of the ISO/IEC 13346 standard. By connecting a phase change optical disc drive to a PC by way of a 1394 interface and a serial bus protocol 2 (SBP-2), the PC can also treat a file that was written in a UDF compliant format as a single file.

Hereinafter, it will be described specifically how the data processor 30 of this preferred embodiment performs the write operation. In the following description, the term "associated" will be used to refer to the video and sound to be played back synchronously with each other or the video and audio data representing the video and sound.

Suppose the PS assembling section 104 has generated a VR-compliant stream 10 in which not all of the associated video and audio data is included in a single VOBU. As described above, each VOBU is defined by the video playback time, for example. Thus, in that case, a portion of the audio data may be expected to be stored in a succeeding VOBU separately from its associated video data. It should be noted that the audio data contained in the same VOBU as the video data includes a number of audio frames.

Figure 7:
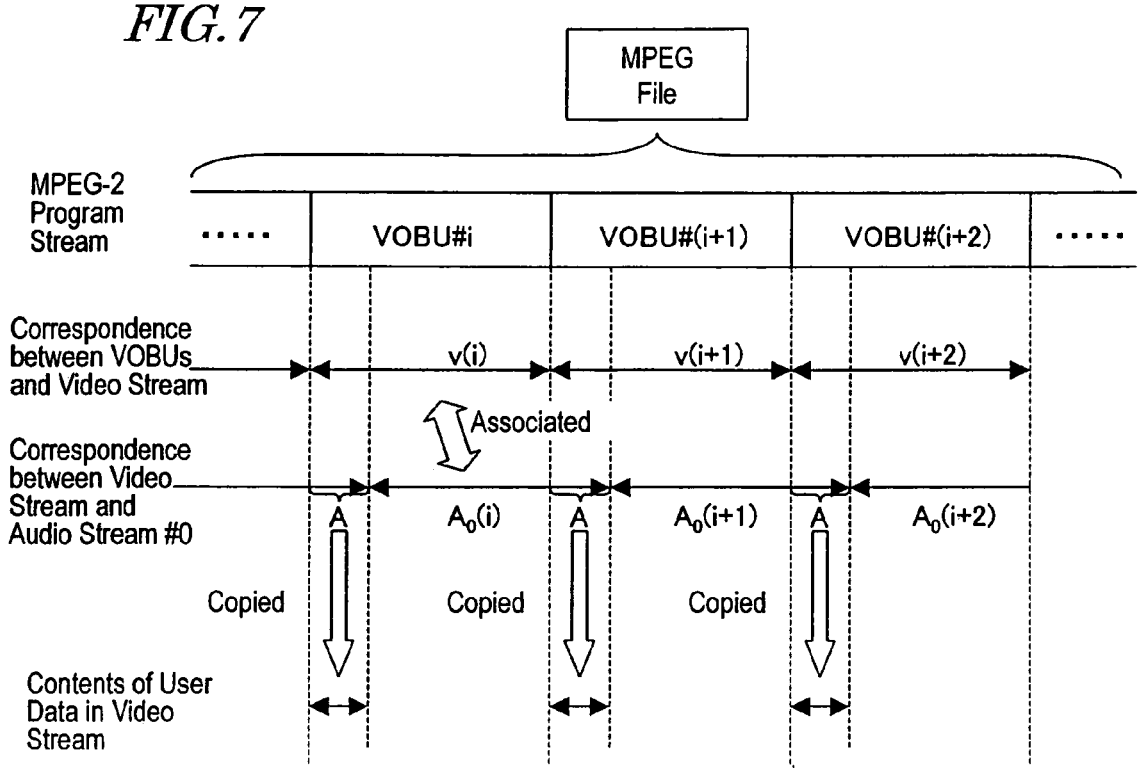
FIG. 7 shows a correlation among VOBUs, a video stream and an audio stream according to a first preferred embodiment.

FIG. 7 shows a correlation among VOBUs, a video stream and an audio stream according to this preferred embodiment. The top column shows a set of VOBUs that make up the VR-compliant stream 10 defined as an MPEG file, the second column shows a set of video data contained in the respective VOBUs, and the third column shows a set of audio data associated with the set of video data. The video data contained in VOBU #i is identified by V(i), for example. The audio data to be played back synchronously with the video data V(i) is identified by $A_0(i)$, for example. The top column shows VOBUs that make up an MPEG-2 program stream. The second column shows a set of video frames to be stored in the respective VOBUs. The third column shows positional relationships between the storage locations of the audio data Ao(i) to be played back synchronously with the set of video frames and the VOBU boundaries by vertical dashed lines. Almost the same statement will apply to FIGS. 9, 10, 11, 12, 13 and 14 to make reference to later.

On this supposition, the storage location of the audio data $A_0(i)$ to be played back synchronously with the video data V(i) starts at a halfway point of VOBU #i and the last portion thereof is stored in the top portion of VOBU #(i+1). In the example illustrated in FIG. 7, the data A stored in the area ranging from the top of VOBU #(i+1) to just before the audio data $A_0(i+1)$ is the audio data stored in VOBU #(i+1) that is different from VOBU #i where the video data is stored. This audio data will be referred to herein as "separately stored data".

In generating VOBU #i and VOBU #(i+1), the PS assembling section 104 also generates copied data having the same contents as the separately stored data. Then, the PS assembling section 104 stores the copied data in at least the top video pack of VOBU #(i+1), which is next to VOBU #i. More specifically, the PS assembling section 104 stores the copied data in the user data area of the top video pack (e.g., the user data area 42 shown in FIG. 4). To store the copied data in the user data area 42 means to store every video and audio data within one VR-compliant stream 10 (or within a single file). It should be noted that the "copied data" refers herein to a copy of the separately stored audio data itself.

In this case, only the elementary stream may be copied or the data may be copied on a pack-by-pack basis. In the latter case, however, the SCR value of the pack header of each audio pack does not have to represent a transfer timing and may hold its copied value as it is. Likewise, the PTS values in the PES packet header within each pack may also be used as they are.

Furthermore, even in generating VOBU #(i+1) and VOBU #(i+2), the PS assembling section 104 also generates copied data having the same contents as the separately stored data of the audio data $A_0(i+1)$ associated with the video data V(i+1), i.e., a portion of the audio data Ao(i+1) to be stored in VOBU (i+2). Then, the PS assembling section 104 stores that copied data in the top video pack of VOBU #(i+1) that is next to VOBU #i.

The PS assembling section 104 has the function of adding a PTS by understanding what picture of the video and what audio frame should be played back synchronously with each other. Thus, the PS assembling section 104 knows what portion of the audio data Ao is the separately stored data. This is why it is easy for the PS assembling section 104 to find the separately stored data.

Figure 8:
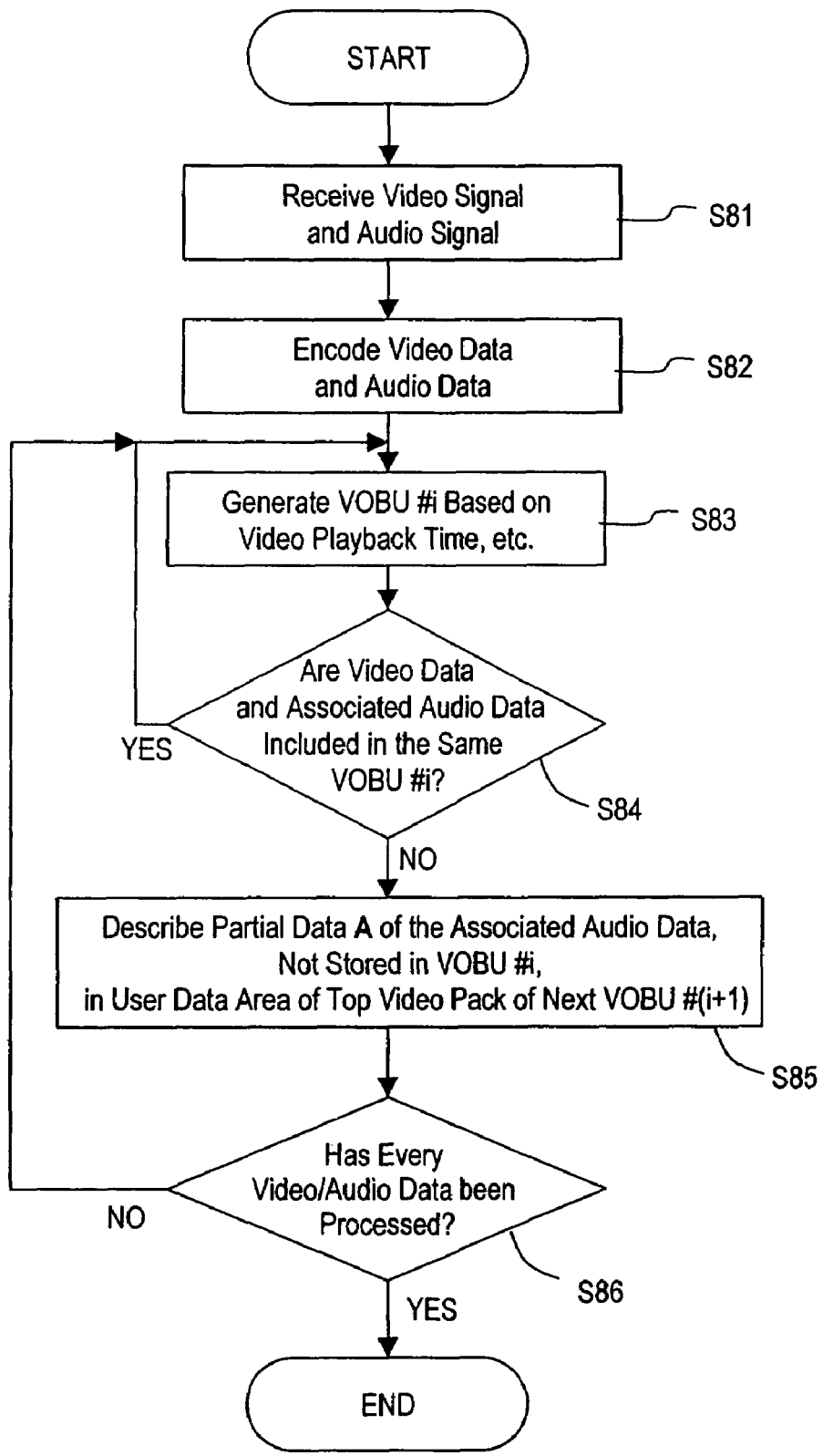
FIG. 8 is a flowchart showing a procedure in which the data processor 30 performs a writing process.

FIG. 8 is a flowchart showing a procedure in which the data processor 30 carries out the write process. First, in Step S81, the video signal input section 100 and audio signal input section 102 receive a video signal and an audio signal, respectively. Next, in Step S82, the video compressing section 101 and audio compressing section 103 compress and code the video and audio data obtained from the respective signals.

In the next step S83, the PS assembling section 104 generates VOBU #i based on the video playback time, for example. It should be noted that the arrangement (or the order) of respective packs such as video packs in VOBU #i is determined so as to comply with the provisions of the system target decoder model. For example, the arrangement (order) of the respective packs is determined so as to satisfy the buffer capacity as defined by the program stream system target decoder (P-STD) model.

Next, in Step S84, it is determined whether or not the associated video and audio data can be stored in the same VOBU. If the answer is YES, the data of the VOBU generated is sequentially supplied to the writing section 120, which writes that data on the optical disc 131 in response. Thereafter, processing steps S83 and S84 are repeatedly carried out.

However, if the associated video and audio data cannot be stored in the same VOBU (i.e., if the data A, or a portion of the audio data associated with the video data, is stored as the separately stored data in the succeeding VOBU), then the processing advances to the next step S85. In Step S85, the PS assembling section 104 describes the separately stored data (i.e., the partial data A shown in FIG. 7) in the user data area of the top video pack of the next VOBU #i and then outputs it to the writing section 120. In response, the writing section 120 writes that data on the optical disc 131.

Thereafter, in Step S86, the PS assembling section 104 determines whether or not every video/audio data has been processed. If the answer is NO, then Step S83 and succeeding processing steps are carried out repeatedly. But if the answer is YES, then the write operation is ended.

Hereinafter, the functions of respective components contributing to the playback function of the data processor 30 will be described with reference to FIG. 3. After that, it will be described exactly how the data processor 30 performs a playback operation.

The data processor 30 includes a video display section 110, an audio output section 112, a reading section 121, a converting section 141, an output interface section 140, a reading control section 162, a play list playback control section 164 and an MPEG-2 PS decoder 171.

The video display section 110 may be a display device such as a TV set for outputting video, while the audio output section 112 may be a loudspeaker for outputting sound. It should be noted that the video display section 110 and audio output section 112 are not essential components for the data processor 30 but may be provided as external equipment. Under the instruction of the reading control section 162, the reading section 121 converts the VR-compliant stream 10, which has been read out as an analog signal from the optical disc 131 by the optical pickup 130, into a digital signal. The reading control section 162 specifies the VOBU to read and the data to be contained in the VOBU and instructs the optical pickup 130 to read that data. The play list playback control section 164 plays back the respective scenes of the moving pictures in the user's specified order. Each scene may be managed on a VOBU basis, for example.

The MPEG2-PS decoder 171 (which will be simply referred to herein as a "decoder 171") includes a program stream disassembling section 114, a video decompressing section 111 and an audio decompressing section 113. The program stream disassembling section 114 (which will be referred to herein as "PS disassembling section 114") isolates the video data and audio data from the VR-compliant stream 10. The video decompressing section 111 decodes the video data, which was compression coded so as to comply with the MPEG2 standard, in accordance with the same standard, thereby outputting the decoded data as a video signal. In the same way, the audio decompressing section 113 decodes the audio data, which was compression coded so as to comply with the MPEG1-Audio standard, in accordance with the same standard, thereby outputting the decoded data as an audio signal.

First, it will be described generally how the data processor 30 performs a playback operation. In playing back the VR-compliant stream 10 stored, the data processor 30 reads data from the optical disc 131 and decodes (reproduces) the read data in parallel with each other. In this case, the data reading rate is controlled so as to be higher than the maximum data decoding rate such that the data to reproduce is never exhausted. Accordingly, if the VR-compliant stream 10 continues being decoded, extra data to reproduce can be obtained by the difference between the maximum data decoding rate and the data reading rate per unit time. While the pickup 130 cannot read data (e.g., during a seek operation), the data processor 30 decodes the extra data, thereby playing back the VR-compliant stream 10 seamlessly.

Suppose the reading section 121 has a data reading rate of 11.08 Mbps, the PS disassembling section 114 has a maximum data decoding rate of 10.08 Mbps and the pickup has a longest move time of 1.5 seconds, for example. In that case, to play back the VR-compliant stream 10 seamlessly, extra data of 15.12 megabits is needed while the pickup 130 is moving. And to secure this amount of data, reading should be done continuously for 15.12 seconds. That is to say, that extra data should be read continuously for a period of time calculated by dividing 15.12 megabits by the difference between the data reading rate of 11.08 Mbps and the maximum data recording/decoding rate of 10.08 Mbps. Accordingly, while the data is being read continuously for 15.12 seconds, data of at most 167.53 megabits (i.e., data read in 16.62 seconds) will be read out. Thus, by securing a continuous data area corresponding to at least 16.62 seconds (approximately 17 seconds), continuous data playback can be guaranteed. A number of defective logical blocks may be included in the continuous data area. In that case, however, the time it will take to read those defective logical blocks during the playback should be taken into account, and therefore, the continuous data area needs to correspond to slightly longer than 16.62 seconds in playback time.

Hereinafter, it will be described specifically how the data processor 30 performs its playback operation. First, it will be described how the data processor 30 operates in playing back the video and sound sequentially from the beginning of the VR-compliant stream 10.

The reading control section 162 specifies a VOBU to play and instructs the optical pickup 130 to read data sequentially from the beginning of that VOBU. The PS disassembling section 114 splits the VR-compliant stream 10, which has been read out by the pickup 130 and reading section 121, into video data and audio data. The video and audio decompressing sections 111 and 113 decode the video and audio data, respectively. Then, video is displayed on the video display section 110 based on the resultant video signal, and sound is output through the audio output section 112 based on the resultant audio signal.

Next, it will be described how the data processor 30 plays back the VR-compliant stream 10 from the optical disc 131 in accordance with a "play list" in, which the user specified his or her desired VOBU playback order.

Suppose a portion of the play list specifies that the playback of VOBU #i be followed by that of VOBU #k (where k≠(i+1)). Then, the play list playback control section 164 instructs the optical pickup 130 to read out VOBU #i first. The PS disassembling section 114 splits the data of the VOBU #i that has been read by way of the optical pickup 130 and reading section 121 into video data and audio data, decodes them, and outputs decoded data. In this case, if data is written on the user data area of the first video pack of VOBU #i, that data will be ignored because the data is not the audio data associated with the video of VOBU #i.

Thereafter, when the data is completely read out through the end of VOBU #i, the play list playback control section 164 instructs the optical pickup 130 to read data from the user data area of the first video pack of the next VOBU #(i+1). This data is the separately stored audio data that is associated with the video included in VOBU #i. Thus, after having decoded the audio data from VOBU #i, the audio decompressing section 113 decodes that separately stored data and outputs it as sound. Subsequently, in accordance with the instruction of the play list playback control section 164, data is read out from VOBU #k, which is the next VOBU to play. The PS disassembling section 114 obtains the data of the next VOBU #k to play by way of the reading section 121, decodes it and outputs the decoded data.

At the top of a VOBU, there is an RDI pack, which is then followed by a video pack. Thus, the separately stored data can be read out from the first video pack of the succeeding VOBU easily and quickly. The same statement applies to even a situation where the separately stored data covers a plurality of video packs around the top of a VOBU. The data processor 30 also reads that separately stored data during the playback, thereby obtaining every audio data that is associated with the video contained in the VOBU. As a result, the sound can be reproduced seamlessly. The separately stored data of the audio data Ao(i) does not have to be stored in the user data area of the top video pack of VOBU #(i+1) but may be multiplexed and stored in a private stream within VOBU #i.

Optionally, the data processor 30 may output the stored data without splitting it into two streams or even without decoding it as described above. In that case, the converting section 141 may convert the VR-compliant stream 10 read into a predetermined format (e.g., a format compliant with the DVD-Video standard) and the output interface section 140 may output the converted stream. Even so, by reading not only the data of VOBU to play back from the VR-compliant stream 10 but also the data from the user data area of the first video pack in the succeeding VOBU, the sound can still be reproduced seamlessly through the output device. It should be noted that the output interface section 140 is an interface compliant with the IEEE 1394 standard and can control a data reading or writing process being carried out by an external device.

The second and other preferred embodiments of the present invention to follow are variations of the data processor 30 of this preferred embodiment in terms of read and write operations. Each component of the data processor 30 as described above for the first preferred embodiment is supposed to maintain the same function in the following preferred embodiments, too, unless otherwise stated.

EMBODIMENT 2

In the first preferred embodiment described above, a single video stream and a single audio stream, which are associated with each other, are supposed to be included in each VR-compliant stream 10 and a copy of a portion of the audio data (i.e., the separately stored data), which cannot be stored in the same VOBU as the video data, is supposed to be included in the video data (or stored in the video pack) of its succeeding VOBU.

In this preferred embodiment, however, not only the one video stream and one audio stream associated but also another audio stream, obtained by making a copy of the data in the audio stream, are included. Hereinafter, it will be described how to perform a write operation according to this preferred embodiment.

Figure 9:
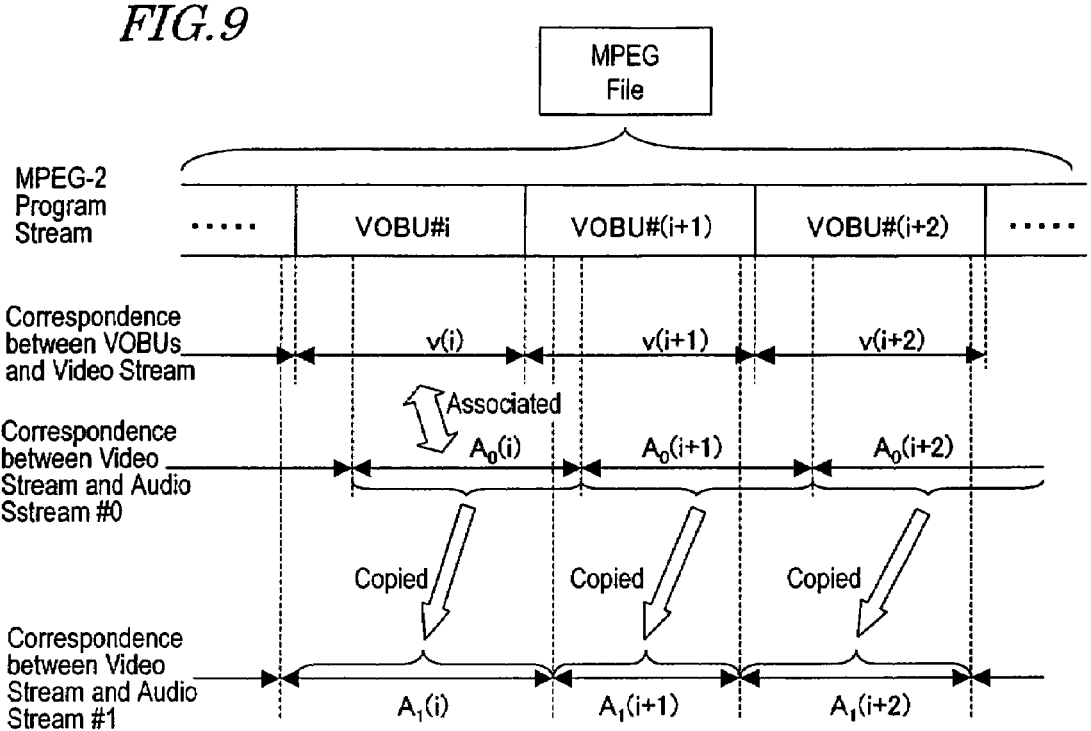
FIG. 9 shows a correlation among VOBUs, a video stream and audio streams according to a second preferred embodiment.

FIG. 9 shows a correlation among VOBUs, a video stream and audio streams according to this preferred embodiment. This VR-compliant stream 10 is defined as a single MPEG file as in the first preferred embodiment described above.

However, unlike the first preferred embodiment, two audio streams are multiplexed together in this preferred embodiment. Suppose the audio stream associated with the video stream is called an "audio stream #0". There is the separately stored data in the audio stream #0.

The PS assembling section 104 stores a copy of the data in the audio stream #0 as another audio stream #1 on the optical disc 131. More specifically, the PS assembling section 104 makes a copy of the data in the audio stream #0, associated with the video contained in VOBU #i, thereby generating audio packs for the audio stream #1. Then, the PS assembling section 104 multiplexes those audio packs within VOBU #i of the VR-compliant stream 10. The audio streams #0 and #1 are identifiable by the stream IDs described on the packet headers of the respective packs. It should be noted that some restrictions should to be satisfied (e.g., the size of the data to be copied should fall within the range allowed by the audio buffer of the program stream system target decoder (P-STD)). In FIG. 9, data obtained by copying the audio data $A_0(i)$, $A_0(i+1)$, $A_0(i+2)$ and so on, which make up the audio stream #0, are stored as $A_1(i)$, $A_1(i+1)$, $A_1(i+2)$ and so on.

In this case, however, the audio streams #1 and #2 are supposed to have the same bit rate. Accordingly, the copied data of Ao(i) cannot always be stored within VOBU #i. If the overall playback time of the video frames within VOBU #i is equal to the overall transfer time of the data of VOBU #i (i.e., the difference between the top SCR value of VOBU #i and that of VOBU #(i+1)), then the copied of Ao(i) can be stored with no room left.

However, to reproduce the sound associated with the video without discontinuing it, when VOBU #i is completely read, the audio data associated with the video will need to have been acquired as much as possible. Thus, the PS assembling section 104 modifies the MPEG compliant SCR and PTS values added to the audio packs for the audio stream #0, thereby generating SCR and PTS values for the audio stream #1. That is to say, comparing two packs in which data representing the same sound is stored, the PS assembling section 104 sets the SCR and PTS values added to the audio pack of the audio stream #1 smaller than those added to the audio pack of the audio stream #0 by a predetermined magnitude. This is because the smaller the SCR and PTS values of a pack, the quicker the pack can be read out considering its location in the pack arrangement within the VR-compliant stream 10. For that reason, a greater quantity of data within VOBU #(i+1), corresponding to the separately stored data of the first preferred embodiment, can be stored within VOBU #i.

The PS assembling section 104 describes variation data, representing the decrease of the SCR and PTS values, in the user data area 42 of the first audio pack of VOBU #i, for example.

Hereinafter, it will be described how the data processor 30 of this preferred embodiment performs a playback operation. The following description is particularly true when the playback operation is carried out in accordance with a play list. Thus, that situation will be described as an example.

While the video contained in VOBU #i, which has been stored on the optical disc 131, is being decoded, the play list playback control section 164 decodes the stream #1, not the stream #0. This is because the audio data associated with the video data in VOBU #i is included in the stream #1 in a greater quantity than in the stream #0.

In this case, however, the magnitude of time shift of the audio stream #1, including the copied data, from the audio stream #0 needs to be recorded. The reason is that since the SCR and PTS values of each audio pack of the stream #1 are defined smaller than those of its associated pack of the stream #0, the audio data cannot be reproduced as it is synchronously with the video. Thus, the PS disassembling section 114 reads out the magnitude of playback timing shift from the user data area 42 of the first video pack of VOBU #i, adds this value to the PTS (i.e., delays the playback time) and then reproduces the sound. As a result, the video and sound can also be played back synchronously with each other.

For example, the difference between the PTS value of an audio frame AF #0 of the audio stream #0, which should be synchronized with the top video frame of VOBU #i, and that of the audio frame including the copied data of AF #0 may be stored within the management information file for a moving picture stream file "VR_MOVIE.VRO". Alternatively, that difference may also be stored in a maker's own data area within the RDI pack of each VOBU. In that case, in reading VOBU #i, the reading control section needs to subtract the difference from the time stamp value of each video frame at the top of VOBU and may read all audio frames included in the audio stream #1 following the result of that subtraction.

As another alternative, the magnitude of playback timing shift may be stored in the maker's own data area within the RDI pack of each VOBU.

It should be noted that if PC's playback application software gets a stored moving picture file read by an optical disc drive connected to the PC, the audio stream #0 is played back. That is to say, in playing back a moving picture file as a normal MPEG file, the audio stream #0 is used.

Even if not every audio data for each VOBU is included, the amount of separately stored data, generated for the audio stream #0, can be rather small. Accordingly, when the playback operation is carried out in accordance with a play list, the sound can be reproduced almost seamlessly.

Optionally, information about the contents of the audio stream #1 recorded may be stored separately. For example, a flag indicating that the copied data of the audio stream #0 is stored in the audio stream #1 may be recorded within the management information file for the moving picture stream file "VR_MOVIE.VRO". This flag is preferably recorded at least on a VOB basis. Alternatively, the flag may also be recorded within a VOB of a moving picture stream or within the audio stream #1, for example. This flag shows whether the audio stream #1 stores different sound from that of the audio stream #0 or the copied data of the audio stream #0.

EMBODIMENT 3

In the first preferred embodiment, the separately stored data is stored in the user data area 42 within a video pack.

In this preferred embodiment, however, the data processor 30 stores the separately stored data as a different file from the MPEG file defining the VR-compliant stream 10.

Figure 10:
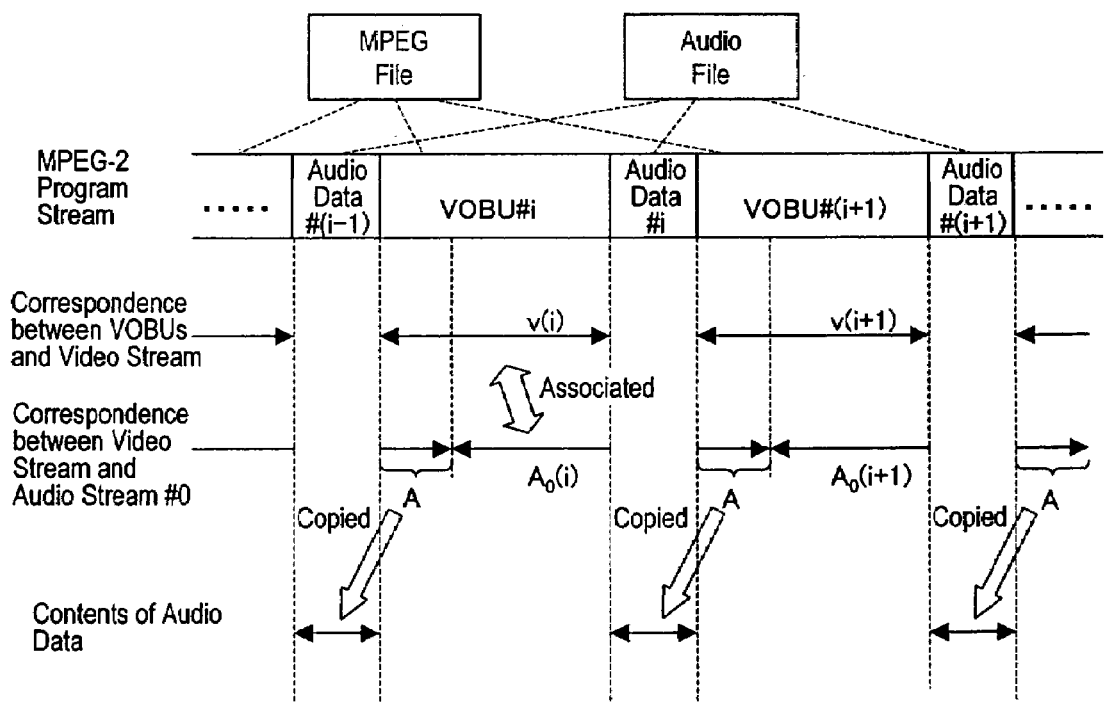
FIG. 10 shows a correlation among VOBUs, a video stream and an audio stream according to a third preferred embodiment.

FIG. 10 shows a correlation among VOBUs, a video stream and an audio stream according to this preferred embodiment. In generating a VOBU #i, the PS assembling section 104 identifies separately stored data associated with the VOBU and makes a copy of the separately stored data, thereby generating audio data #i. Then, the PS assembling section 104 records that audio data and the respective VOBUs, of which the VR-compliant stream 10 is made up, physically alternately. Each item of the audio data and each of the VOBUs are stored as one audio file and one MPEG file, respectively. The PS assembling section 104 interleaves the audio data #i with the VOBU #i such that the VOBU #i is immediately followed by the audio data #i.

On the other hand, when the playback operation is carried out in accordance with a play list, even if the play list demands that VOBU #k (where k≠(i+1)) be played back after VOBU #i has been played back, the play list playback control section 164 reads not only the VOBU #i but also succeeding audio data #i as well and then the data of the VOBU #k to be played back next. Subsequently, the PS disassembling section 114 splits the read data into video data and audio data, which are then decoded and output by the video decompressing section 111 and audio decompressing section 113, respectively. In this case, the audio decompressing section 113 decodes and reproduces the audio data in the audio pack included in the VOBU #i and then the audio data #i included in the audio data file.

Since the audio data about the separately stored data is stored next to the VOBU to be played back, that audio data can be continuously read easily and quickly. The data processor 30 also reads the separately stored data during the playback operation, thereby obtaining every audio data associated with the video included in the VOBU. As a result, the sound can be reproduced without a break.

In this preferred embodiment, a copy of the separately stored data is stored just after its associated VOBU. Alternatively, the copy may also be stored just before its associated VOBU.

EMBODIMENT 4

In the third preferred embodiment, the data processor generates an audio file based on only the separately stored data of the audio stream separately from the MPEG file and records it. Also, the audio data #i associated with VOBU #i is stored immediately after VOBU #i.

Meanwhile, the data processor of this preferred embodiment generates an audio file separately from the MPEG file for every data in the audio stream and records it. Also, audio data associated with each VOBU is stored before that VOBU.

Figure 11:
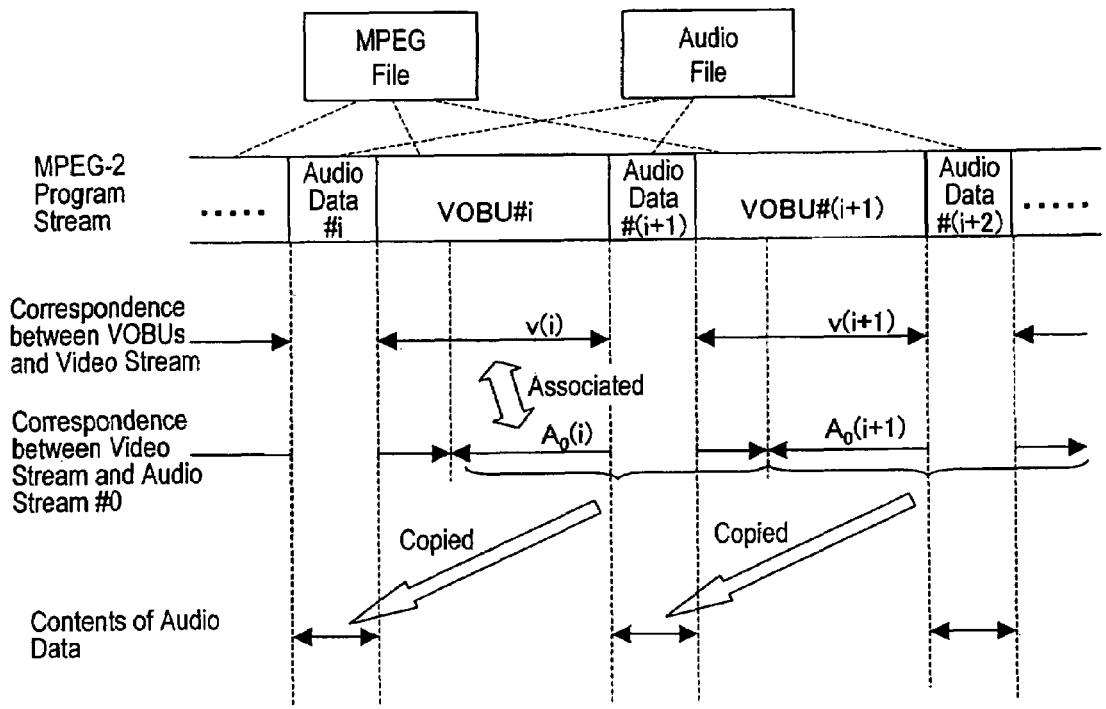
FIG. 11 shows a correlation among VOBUs, a video stream and an audio stream according to a fourth preferred embodiment.

FIG. 11 shows a correlation among VOBUs, a video stream and an audio stream according to this preferred embodiment. In generating VOBU # the PS assembling section 104 identifies the audio data $A_0(i)$ associated with the video data V(i) included in the VOBU and makes a copy of every item of the audio data $A_0(i)$, thereby generating audio data #i Then, the PS assembling section 104 records that audio data and the respective VOBUs, of which the VR-compliant stream 10 is made up, physically alternately. Each item of the audio data and each of the VOBUs are stored as one audio file and one MPEG file, respectively. The PS assembling section 104 interleaves the audio data #i with the VOBU #i such that the audio data #i is immediately followed by the VOBU #i.

On the other hand, when the playback operation is carried out in accordance with a play list, the play list playback control section 164 instructs that the audio data #i be read before the VOBU #i is read. Then, the audio data #i will have been read and decoded by the audio decompressing section 113 before the VOBU #i has been read. Thus, every sound can be reproduced synchronously with the video in the VOBU #i. Accordingly, even if VOBU #k (where k≠(i+1)) should be played back after that, the sound can still be reproduced seamlessly.

The fourth preferred embodiment has been described on the supposition that the audio data #i is stored before the VOBU #i. Alternatively, the audio data #i may also be stored after the VOBU #i as in the third preferred embodiment. In that case, the audio data #i needs to be read after the VOBU #i has been played back and before another VOBU starts being read.

In the third and fourth preferred embodiments described above, the structure of the data in the audio file is not particularly mentioned. The structure may be an audio elementary stream, an MPEG2 program stream with an audio stream, an MPEG4 stream with an audio stream, or any other system stream.

EMBODIMENT 5

In the first preferred embodiment, the separately stored data associated with the VOBU #i is stored in the next VOBU #(i+1).

Meanwhile, in this preferred embodiment, the separately stored data associated with the VOBU #i is stored as a separate stream in the VOBU #i itself.

Figure 12:
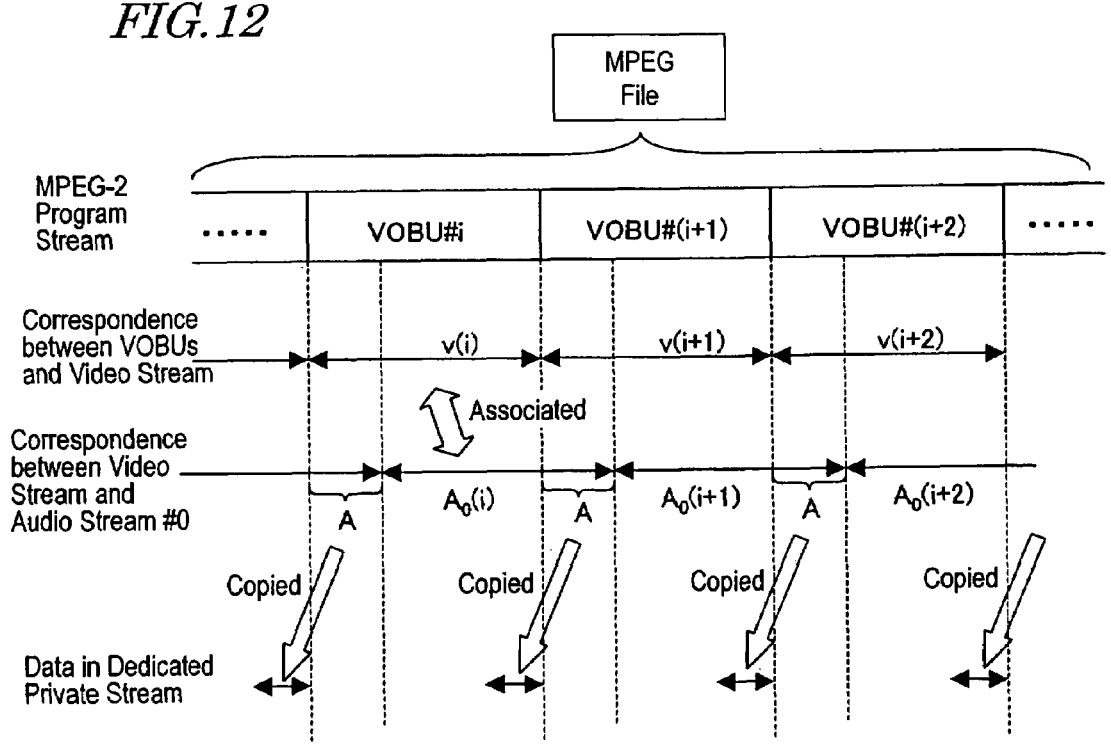
FIG. 12 shows a correlation among VOBUs, a video stream and an audio stream according to a fifth preferred embodiment.

FIG. 12 shows a correlation among VOBUs, a video stream and an audio stream according to this preferred embodiment. The PS assembling section 104 makes a copy of the separately stored data A associated with the VOBU #i and multiplexes it as a private stream dedicated for the separately stored data A within the VOBU #i.

The VR-compliant stream 10 is provided with stream IDs to identify the video stream and audio stream included in itself. The stream IDs are stored in a PES packet header. The stream ID of the video stream may be 0xE0 and the stream ID of the audio stream may be 0xC0 or 0xBD, for example. 0xBD is a value defined by the MPEG2 system standard for a private stream. In the VR standard, if 0xBD is used for the audio stream, then the compression code of the audio stream is identified by one byte that immediately follows the PES packet header. 0xBD is also used as the stream ID of the private stream that is newly provided in this preferred embodiment.

When the playback operation is carried out in accordance with a play list, even if the play list demands that the VOBU #k (where k≠(i+1)) should be played back after VOBU #i has been played back, the separately stored data A, included as a private stream, can be read and reproduced immediately after the audio stream #0. Thus, the sound can be easily reproduced without a break.

Figure 13:
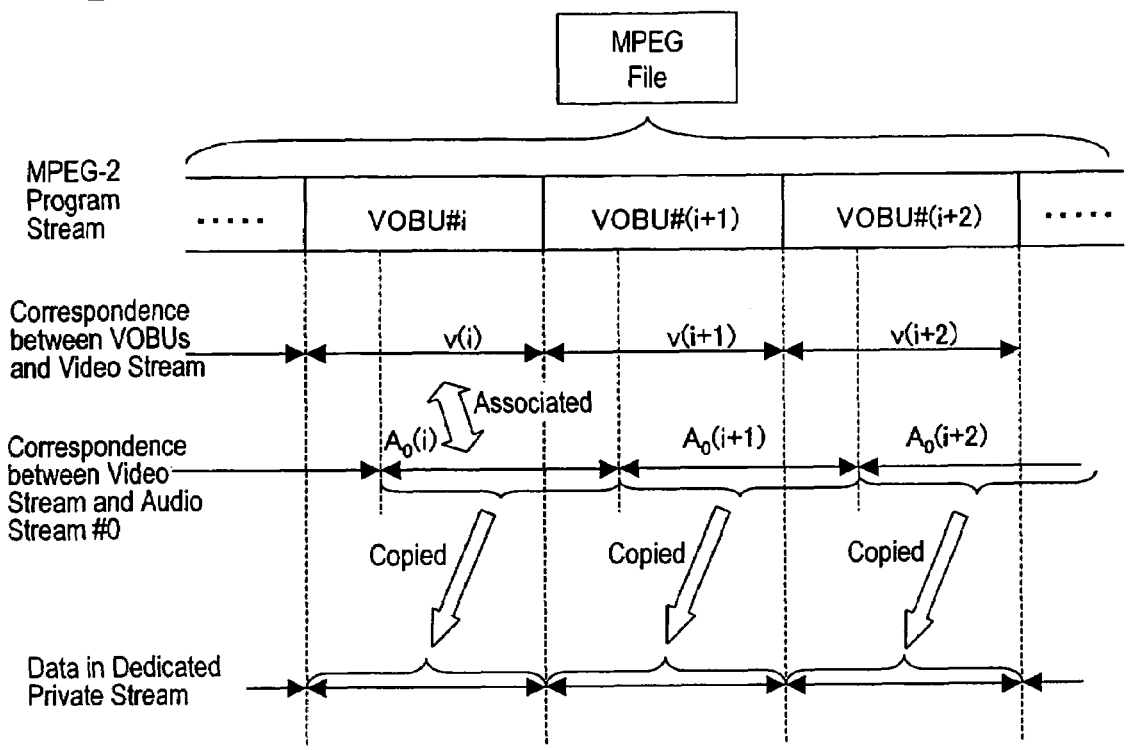
FIG. 13 shows a correlation among VOBUs, a video stream and an audio stream according to a modified example of the fifth preferred embodiment.

Optionally, not only the separately stored data A but also the data in the whole audio stream may be copied to a private stream, which is then be multiplexed as a private stream dedicated for the separately stored data A within the VOBU #i. FIG. 13 shows a correlation among VOBUs, a video stream and an audio stream according to a modified example of this preferred embodiment.

The PS assembling section 104 makes a copy of the audio data associated with the video in the VOBU #i and stores it as a dedicated private stream 1 (with stream_ID=0xBD) within the VOBU #i. The buffer size of a system target decoder for this private stream is supposed to be big enough to store the audio data for at least two seconds. In this case, the "two seconds" is the sum of the longest playback time (one second) of the video included in the VOBU and the maximum playback delay (one second) of the system target decoder.

When the playback operation is carried out in accordance with a play list, even if the play list demands that the VOBU #k (where k≠(i+1)) should be played back after VOBU #i has been played back, the copy of the audio data #0, which is stored in the private stream 1, may always be reproduced. Then, the sound can be easily reproduced without a break.

By storing the copied data of an audio stream as a private stream as is done in this preferred embodiment, the audio data can be easily reproduced seamlessly when editing is done on the basis of VOBUs of an MPEG file. This is because if editing is done so as to combine two VOBUs together, then the private streams included in those VOBUs are also combined together to obtain combined separately stored data.

EMBODIMENT 6

In the first example of the fifth preferred embodiment, the PS assembling section 104 stores the separately stored data A associated with the VOBU #i as a private stream within the VOBU #i itself.

On the other hand, in this preferred embodiment, a copy of the separately stored data A associated with the VOBU #i is stored as ancillary data within an audio frame in the VOBU #i.

Figure 14:
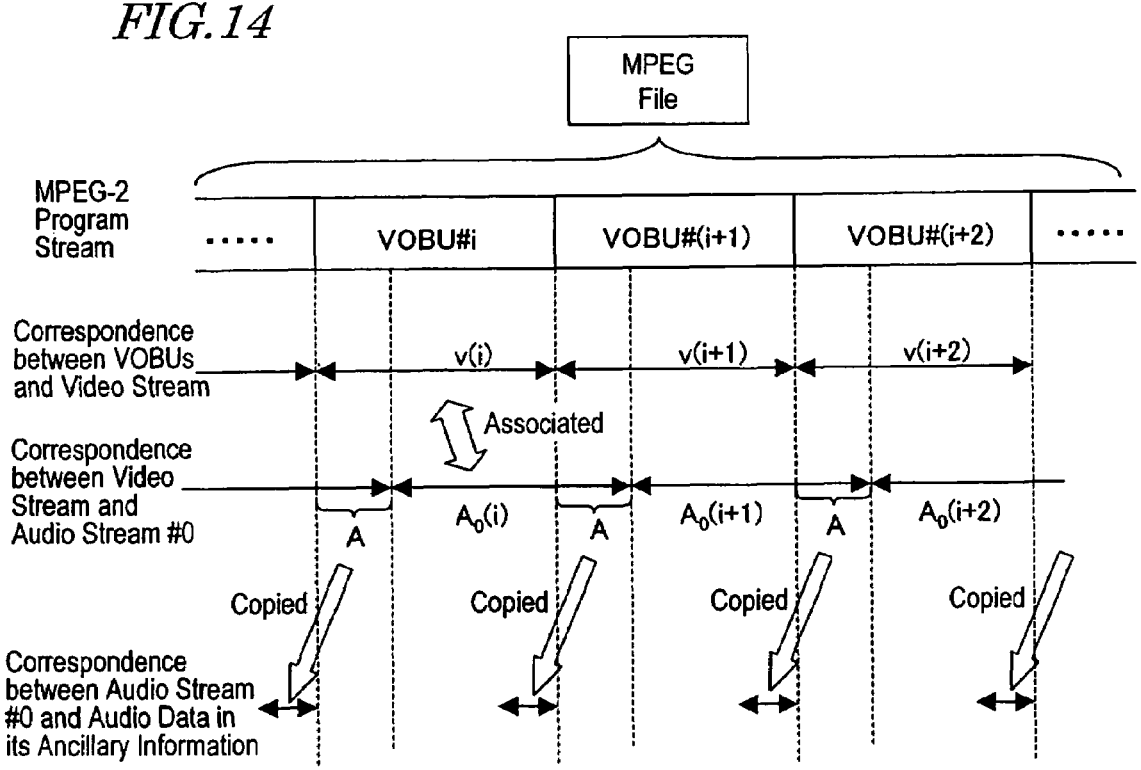
FIG. 14 shows a correlation among VOBUs, a video stream and an audio stream according to a sixth preferred embodiment.

FIG. 14 shows a correlation among VOBUs, a video stream and an audio stream according to this preferred embodiment. The PS assembling section 104 makes a copy of the separately stored data A associated with the audio stream #0 of the VOBU #i and stores the copied data in the ancillary data (AD) area within an audio frame of the VOBU #i.

Figure 15:
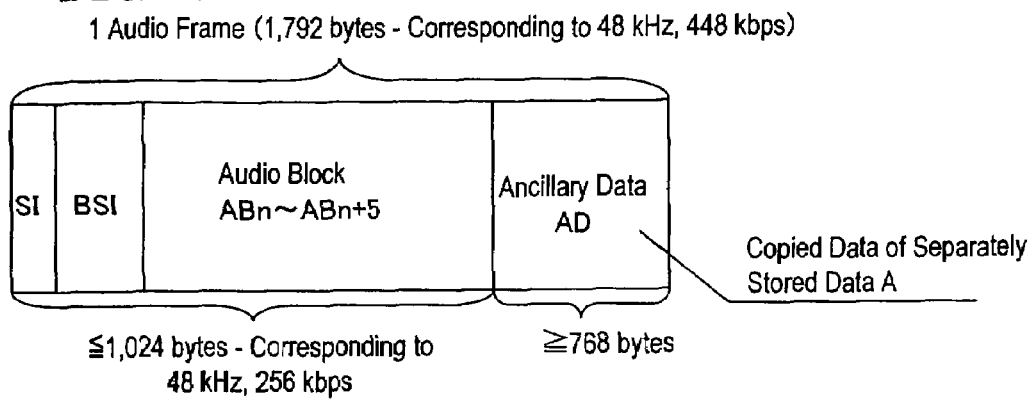
FIG. 15 shows the data structure of an AC-3 compliant audio frame and the location and size of its ancillary information.

FIG. 15 shows the data structure of an AC-3 compliant audio frame generated by the audio compressing section 103. The AC-3 compliant audio frame is made up of sync information SI, bit stream information BSI, audio blocks ABn through ABn+5 and ancillary information AD.

The sync information SI includes rate information representing the bit rate of the audio frame. In this preferred embodiment, the audio frame is supposed to have a bit rate of 448 kbps (i.e., the frame size code shows 448 kbps). The audio frame has a data length to be determined by the bit rate information defined as the sync information SI (e.g., 1,792 bytes in the example illustrated in FIG. 15). Actually, however, the audio compressing section 103 writes the sync information, bit stream information and effective data of the audio blocks at a bit rate of 256 kbps or less and reserves the ancillary information area for the separately stored data A that will be stored later.

As a result, the difference between the data length of one frame as defined by the data rate of 448 kbps (1,792 bytes) and that of one frame as defined by the data rate of 256 kbps (1,024 bytes), i.e., a data length of 768 bytes as defined by 192 kbps, is reserved for the ancillary information area. The PS assembling section 104 stores a copy of the separately stored data A shown in FIG. 14 in that ancillary information area. The average bit rate of the sound represented by the separately stored data A is supposed to be 192 kbps, which is less than the difference between the data rates of 448 kbps and 256 kbps.

As described above, by providing a reserved area in advance within each audio frame of the audio stream to be recorded and by storing a copy of the separately stored data in that reserved area, the audio data that could not be stored within a VOBU (i.e., the separately stored data) can be stored substantially.

If the playback operation is carried out in accordance with a play list, the PS disassembling section 114 analyzes the data stream when the data has been read from the VOBU. In this manner, the audio decompressing section 113 can obtain a copy of the separately stored data A, which cannot be obtained in a conventional data structure. As a result, even in a video scene where the sound normally discontinues, the sound can also be reproduced seamlessly synchronously with the video.

Optionally, half of the bit rate defined by the sync information SI may be allocated to an actual bit rate, while the other half may be allocated to a bit rate for the separately stored data. For example, if the AC-3 compliant audio stream has a bit rate of 448 kbps, then the actual bit rate may be 224 kbps and the bit rate for the separately stored data may also be 224 kbps. By adopting such a format for the audio frame, every audio data of the audio stream #0 can be stored in the ancillary information area. The audio stream, obtained by making a copy of the separately stored data, may also be a series of AC-3 compliant audio frames. Furthermore, one audio frame representing the separately stored data A may be stored in the ancillary information areas of two AC-3 compliant audio frames. Furthermore, the data structure of the separately stored data may be an MPEG2 program stream with an audio elementary stream or any other system stream, too.

In this preferred embodiment, only the separately stored data is supposed to be stored in the ancillary information area. However, if there is a sufficient storage space, the entire audio stream #0 may be stored there.

EMBODIMENT 7

In the sixth preferred embodiment, the separately stored data A is stored in the ancillary information (AD) area of an AC-3 compliant audio frame. In this preferred embodiment, the separately stored data A is stored in the ancillary data area in an MPEG-1 Audio compliant audio frame. In the other respects, this preferred embodiment is identical with the sixth preferred embodiment.

Figure 17:
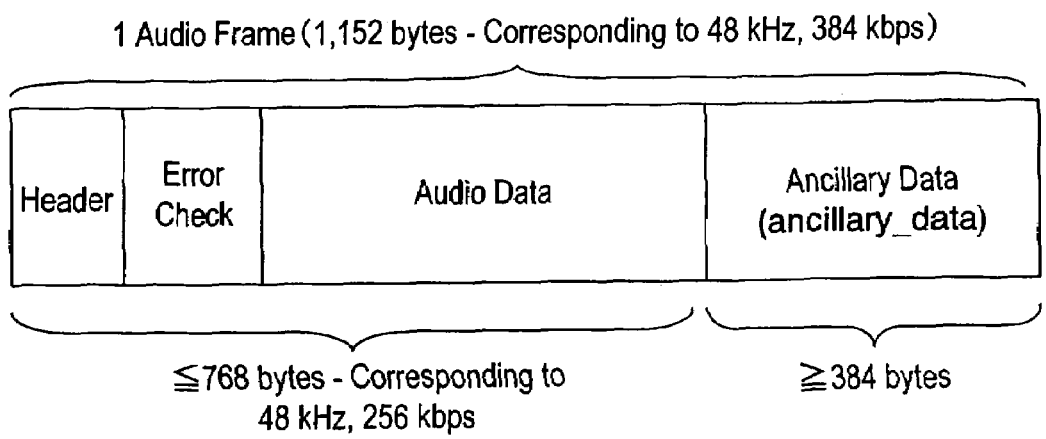
FIG. 17 shows the data structure of an MPEG-1 Audio compliant audio frame.

FIG. 17 shows the data structure of an MPEG-1 Audio compliant audio frame according to this preferred embodiment. The MPEG-1 Audio compliant audio frame includes a header, an error check, audio data and ancillary data. The audio compressing section 103 generates an audio frame having a data structure such as that shown in FIG. 17.

In the header, information about the bit rate, sampling frequency and layer of the audio frame is stored. In this preferred embodiment, the bit rate, sampling frequency and layer are supposed to be 384 kbps, 48 kHz and Layer 2, respectively. In this case, each audio frame has a data length as defined by the bit rate information stored in the header. Actually, however, the audio compressing section 103 stores the information such that the sum of the header, error check and audio data corresponds to 256 kbps or less and reserves the ancillary data area for a copy of the separately stored data A to be stored later.

As a result, the difference between the data length of one frame as defined by the data rate of 384 kbps (1,152 bytes) and that of one frame as defined by the data rate of 256 kbps (768 bytes), i.e., a data length of 384 bytes as defined by 128 kbps, is reserved for the ancillary data area. The PS assembling section 104 stores a copy of the separately stored data A shown in FIG. 14 in this data area. The average bit rate of the sound stored as a copy of the separately stored data A is supposed to be 128 kbps or less.

As described above, by providing a reserved area in advance within each audio frame of the audio stream to be recorded and by storing a copy of the separately stored data in that reserved area, the audio data that could not be stored within a VOBU (i.e., the separately stored data) can be stored substantially.

If the playback operation is carried out in accordance with a play list, the PS disassembling section 114 analyzes the data stream when the data has been read from the VOBU. In this manner, the audio decompressing section 113 can obtain a copy of the separately stored data A, which cannot be obtained in a conventional data structure. As a result, even in a video scene where the sound normally discontinues, the sound can also be reproduced seamlessly synchronously with the video.

In this preferred embodiment, only the separately stored data is supposed to be stored in the ancillary information area. However, if there is a sufficient storage space, the entire audio stream #0 may be stored there.

The audio stream, obtained by making a copy of the separately stored data, may also be a series of MPEG-1 Audio compliant audio frames. Furthermore, one audio frame representing the separately stored data A may be stored in the ancillary data areas of two MPEG-1 Audio compliant audio frames. Furthermore, the data structure of the separately stored data may be an MPEG2 program stream with an audio elementary stream or any other system stream, too.

In the preferred embodiments described above, the issue is how to record and play back either a copy of the separately stored data or a copy of the overall audio stream #0. Alternatively, the data processor 30 may also be operated so as to read the separately stored data directly during the read operation with no special processing done during the write operation. More specifically, if the play list demands that VOBU #k (where k≠(i+1)) should be played back after the VOBU #i has been played back, the play list playback control section 164 may read the data from the VOBU #i, read the separately stored data next without fail, and then start reading the VOBU #k. Then, there is no need to record the separately stored data redundantly and yet the sound can be reproduced seamlessly, too. According to the MPEG2 standard, however, a program stream with the maximum duration of 1 second might need to be read. Thus, the video could not be played back seamlessly. Accordingly, in this case, the amount of separately stored data generated needs to be minimized while the program stream is being generated.

To make a VOBU by encoding and compressing it so as to eliminate the separately stored data, the video decompressing section 111 may generate each frame such that the video frame size of each VOBU becomes equal to or smaller than "the bit rate of the video divided by the number of frames per second". Then, no separately stored data will be generated with respect to sound. This is because one frame of audio data can be transferred during every single frame period. It should be noted that the image quality might deteriorate due to a limited data size of I (intra) frames.

Alternatively, the audio decompressing section 113 may compress and encode the audio data such that the separately stored data includes at most a predetermined number of frames (e.g., four frames) of audio data.

A VR-compliant stream is used herein as an exemplary program stream. Alternatively, an MPEG1 system stream or an MPEG2 transport stream may also be used. The transport stream may comply with either a digital TV broadcasting standard using transport streams or a digital data broadcasting standard using transport streams. In using the transport streams, transport stream packets are used. A "pack" is known as an exemplary form of a packet.

As another alternative, the VR-compliant stream used as an exemplary program stream may be replaced with a data stream that is based on ISO Base Media File Format as defined by ISO/IEC 14496-12.

Furthermore, the storage medium is supposed herein to be a phase change optical disc. Alternatively, any other optical disc such as a Blu-ray disc, a DVD-RAM, a DVD-R, a DVD-RW, a DVD+RW, an MO, a CD-R or a CD-RW or a different type of disk storage medium such as a hard disk may also be used. Optionally, the storage medium may even be a semiconductor memory such as a flash memory. In this connection, although the read/write head is supposed herein to be a pickup for an optical disc, the read/write head will be a pickup and a magnetic head if the storage medium is an MO and will be a magnetic head alone if the storage medium is a hard disk.

A technique of reproducing sound without a break during a play list playback operation has been described above. Strictly speaking, however, the audio data may sometimes be missing in less than one audio frame. This is because when VOBU #k (where k≠(i+1)) is read after VOBU #i has been read, the video frame period is somewhat different from, and cannot be completely synchronized with, the audio frame period. To prevent the audio data from missing in less than one frame in this manner, not only the separately stored data but also one audio frame data following that data may be included (see the first, third, fourth and fifth preferred embodiments described above). Then, extra audio data will be included but just needs to avoid being reproduced in that case.

Figure 16:
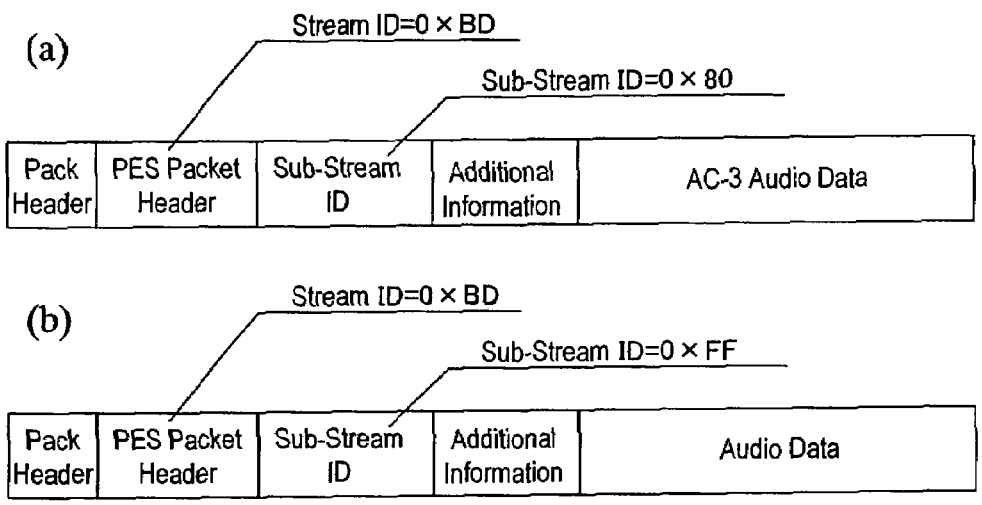
FIGS. 16(*a*) and 16(*b*) show the data structures of audio packs with sub-stream IDs corresponding to the respective types of audio data.

As for the first through fifth preferred embodiments, MPEG-1 Audio, MPEG-2 Audio, AAC or AC-3 may be usually used as an audio compressing method. In adopting AC-3, the audio data may be stored as a private stream 1 (stream_ID=0xBD) in a VOBU as shown in FIG. 16(*a*). In that case, as in the private stream to store the separately stored data in the fifth preferred embodiment, for example, the private stream 1 needs to be identified from the other streams to be used. Thus, the PS assembling section 104 provides a sub-stream ID of 0x80 for just one byte following the PES packet header to identify the private stream. FIG. 16(*a*) shows the data structure of an audio pack having the sub-stream ID of 0x80 and including the AC-3 data.

To distinguish the private stream as described for the fifth preferred embodiment and the AC-3 private stream from each other, sub-stream IDs with mutually different numerical values may be used. FIG. 16(*b*) shows the data structure of an audio pack having a sub-stream ID of 0xFF and including data. This numerical value is a value (0xFF) as defined by the DVD-Video standard.

As for the fifth through seventh preferred embodiments, the separately stored data may include either the elementary stream only or a copy up to the PES packet header. In the foregoing description, no definition has been provided about which of two VOBUs an audio frame located at their boundary should be read synchronously with. For example, an audio frame located on and after the PTS of a video frame may be regarded as belonging to the same VOBU. In this preferred embodiment, an MPEG-2 video stream has been described as exemplary video data. Alternatively, any other compression coding format such as an MPEG-4 video stream or an MPEG-4 AVC video stream may also be used.

INDUSTRIAL APPLICABILITY

Even in a situation where not every audio data and associated video data are included in the same data unit (e.g., in a VOBU), the present invention provides a recorder that can store copied data, obtained by copying at least the missing part of the audio data, at a location easily accessible (e.g., at the top of the next VOBU or immediately before or after that VOBU) while the data unit is being accessed.

Accordingly, particularly when video and sound are played back synchronously with each other in accordance with a play list, every audio data to be reproduced synchronously can be obtained while the data unit including the video data is being accessed. Thus, a player that can significantly reduce the sound discontinuity between the scenes and contributes to improving the users' audiovisual environment can be obtained.

The invention claimed is:

1. A data processor system comprising:
a signal input section to which a video signal and an audio signal are input;
a compressing section for coding and compressing the video and audio signals to generate video data and audio data;
a stream assembling section, which divides each of the video data and the audio data into a plurality of packets, and makes a plurality of data units, in each of which a video packet representing a fraction of the video data and an audio packet representing a fraction of the audio data are multiplexed together to generate a data stream composed of a plurality of said data units; and
a writing section for writing the data stream on a storage medium,
wherein the stream assembling section determines, at least by a video playback time, what video packets and audio packets are included in each said data unit, and what portion of audio data, which is associated with the video data stored in a predetermined data unit, is missing from the predetermined data unit, and puts into the data stream copied data obtained by copying partial audio data including at least that missing portion of the audio data.

2. The data processor system of claim 1, wherein the stream assembling section stores the copied data, associated with the data unit, in at least the first one of the video packets of the following data unit.

3. The data processor system of claim 1, wherein the stream assembling section stores the copied data within the associated data unit.

4. The data processor system of claim 1, wherein the stream assembling section stores the copied data in a dedicated audio stream within the data stream.

5. The data processor system of claim 1, wherein the stream assembling section stores the copied data in a dedicated private data stream within the data stream.

6. The data processor system of claim 1. wherein the stream assembling section puts copied data, obtained by copying the missing portion of the audio data and a remainder of the audio data associated with the video data, into the predetermined data unit.

7. The data processor system of claim 6, wherein the stream assembling section stores the copied data in a dedicated private data stream within the data stream.

8. The data processor system of claim 1, wherein the stream assembling section stores copied data, obtained by copying the missing portion of the audio data and a remainder of the audio data associated with the video data, in a dedicated audio stream within the data stream.

9. The data processor system of claim 1, wherein the stream assembling section stores copied data, obtained by copying the missing portion of the audio data and a remainder of the audio data associated with the video data, in a dedicated audio stream within the data stream, and defines a transfer timing, which is earlier than the transfer timing of the data unit as original of the copied data by a predetermined amount of time, and records the transfer timing as transfer timing information representing the transfer timing of the copied data.

10. The data processor system of claim 1, wherein the stream assembling section generates the data stream us an assembly of a first file including a plurality of said data units and a second file including the copied data, and
wherein the writing section writes the data units and the copied data on the storage medium continuously.

11. The data processor system of claim 10, wherein the stream assembling section defines the second file by copied data to be obtained by copying the missing portion of the audio data and a remainder of the audio data associated with the video data.

12. The data processor system of claim 1, wherein the audio data has a data length corresponding to a first rate, and
wherein the compressing section compresses and codes the audio signal at a second rate, which is lower than the first rate, and puts the compressed audio signal into the audio data, and
wherein the stream assembling section stores the copied data in a reserved area that represents a difference between a second data length, which is defined so as to correspond to the second rate, and the first data length of the audio data, which is defined so as to correspond to the first rate.

13. A data processing method comprising steps of:
receiving a video signal and an audio signal;
generating video data and audio data by coding and compressing the video and audio signals;
generating a data stream composed of a plurality of data units by dividing each of the video data and the audio data into a plurality of packets, and by making a plurality of data units, in each of which a video packet representing a fraction of the video data and an audio packet representing a fraction of the audio data are multiplexed together; and
writing the data stream on a storage medium,
wherein the step of generating the data stream includes the steps of determining, at least by a video playback time, what video packets and audio packets are included in each said data unit, and what portion of audio data, which is associated with the video data stored in a predutermined data unit, is missing from the predetermined data unit, and puffing into the data stream copied data obtained by copying partial audio data including at least that missing portion of the audio data.

14. The data processing method of claim 13, wherein the step of generating the data stream includes the step of storing the copied data, associated with the data unit, in the first one of the video packets of the following data unit.

15. The data processing method of claim 13, wherein the step of generating the data stream includes the step of putling copied data, obtained by copying the missing portion of the audio data and a remainder of the audio data associated with the video data, into the predetermined data unit.

16. The data processing method of claim 13, wherein the step of generating the data stream includes the step of generating the data stream as an assembly of a first file including a plurality of said data units and a second file including the copied data, and wherein the step of writing includes the step of writing the data units and the copied data on the storage medium continuously.

17. The data processing method of claim 16, wherein the step of generating the data stream includes the step of defining the second file by copied data by copying the missing portion of the audio data and a remainder of the audio data associated with the video data.

18. The data processing method of claim 13, wherein the audio data has a data length corresponding to a first rate, and wherein the step of generating the audio data includes the step of generating the audio data by coding and compressing the audio signal at the first rate, and wherein the step of generating the data stream includes the steps of generating the audio data by setting a second rate, which is higher than the first rate, as rate information for the audio data included in the predetermined data unit and storing the copied data in a reserved area that represents a difference between a second data length, which is defined so as to correspond to the second rate, and the first data length of the audio data, which is defined so as to correspond to the first rate.

* * * * *